US012470283B2

(12) United States Patent
Tripathi et al.

(10) Patent No.: US 12,470,283 B2
(45) Date of Patent: Nov. 11, 2025

(54) SYSTEM AND METHOD FOR FLIGHT MANAGEMENT OF A FLEET OF UNMANNED AERIAL VEHICLES

(71) Applicant: Samsung Electronics Co., Ltd., Suwon-si (KR)

(72) Inventors: Prashant Tripathi, Bangalore (IN); Ariyalur Chandrasekaran Ganesh, Bangalore (IN); Rathika Rajendran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 18/325,415

(22) Filed: May 30, 2023

(65) Prior Publication Data

US 2023/0421243 A1 Dec. 28, 2023

(30) Foreign Application Priority Data

Jun. 23, 2022 (IN) .............................. 202241036197
Apr. 18, 2023 (IN) .............................. 2022 41036197

(51) Int. Cl.
 *H04B 7/00* (2006.01)
 *G08G 5/22* (2025.01)
 (Continued)

(52) U.S. Cl.
 CPC ............ *H04B 7/18504* (2013.01); *G08G 5/22* (2025.01); *G08G 5/55* (2025.01); *G08G 5/56* (2025.01); *G08G 5/57* (2025.01); *H04W 76/45* (2018.02)

(58) Field of Classification Search
 CPC ..... H04B 7/18504; H04W 76/45; G08G 5/57; G08G 5/56; G08G 5/55; G08G 5/22; G08G 455/431
 See application file for complete search history.

(56) References Cited

U.S. PATENT DOCUMENTS 9,927,807 B1   3/2018  Ganjoo
10,611,474 B2  4/2020  Kumar et al.
(Continued)

FOREIGN PATENT DOCUMENTS

AU   2014415894 B2 *  8/2018  ......... H04L 65/4038
KR   10-2023094 B1     9/2019
(Continued)

OTHER PUBLICATIONS

Ali et al., Justia, Blockchain-Based Hybrid Authentication https://patents.justia.com/patent/20210306152, Mar. 30, 2021.

*Primary Examiner* — Khai M Nguyen
(74) *Attorney, Agent, or Firm* — Jefferson IP Law, LLP

(57) ABSTRACT

A method for flight management of a fleet of unmanned aerial vehicles (UAVs) is provided. The method includes receiving, by a ground station, network data from at least one network operator and determining whether sensor data associated with a UAV is received from the UAV within a predefined time duration from an instance of previous reception of the sensor data. Furthermore, the method includes generating a quality of communication (QoC) value associated with a communication between the ground station and the UAV and determining if the generated QoC value is within a predefined QoC range. Further, the method includes establishing a communication between the ground station and the UAV by using an alternate communication channel upon determining that the QoC value is outside the predefined QoC range.

20 Claims, 14 Drawing Sheets

(51) Int. Cl.
   *G08G 5/55*     (2025.01)
   *G08G 5/56*     (2025.01)
   *G08G 5/57*     (2025.01)
   *H04B 7/185*    (2006.01)
   *H04W 76/45*    (2018.01)

(56)          References Cited

U.S. PATENT DOCUMENTS

| | | |
|---|---|---|
| 12,082,208 B2* | 9/2024 | Xue ................... H04W 72/23 |
| 2017/0092109 A1 | 3/2017 | Trundle et al. |
| 2017/0257876 A1* | 9/2017 | Loehr .................. H04L 5/0044 |
| 2018/0017973 A1 | 1/2018 | Teague |
| 2019/0137998 A1* | 5/2019 | Kotlyarov ............ G05D 1/0027 |
| 2019/0158597 A1 | 5/2019 | Evans et al. |
| 2019/0235489 A1 | 8/2019 | Cantrell et al. |
| 2020/0372808 A1 | 11/2020 | Carraway et al. |
| 2021/0049914 A1 | 2/2021 | Dalan |
| 2022/0039199 A1* | 2/2022 | Leis ..................... H04W 8/26 |

FOREIGN PATENT DOCUMENTS

| | | | |
|---|---|---|---|
| WO | 2016/102130 A1 | 6/2016 | |
| WO | WO-2020022840 A1 * | 1/2020 | ............ H04W 48/04 |
| WO | 2021/046031 A1 | 3/2021 | |
| WO | WO-2022165448 A1 * | 8/2022 | ............. H04W 4/06 |

* cited by examiner

SYSTEM AND METHOD FOR FLIGHT MANAGEMENT OF A FLEET OF UNMANNED AERIAL VEHICLES

CROSS-REFERENCE TO RELATED APPLICATION(S)

This application is based on and claims priority under 35 U.S.C. § 119(a) of an Indian provisional patent application number 202241036197, filed on Jun. 23, 2022, in the Indian Patent Office, and of an Indian Complete patent application number 202241036197, filed on Apr. 18, 2023, in the Indian Patent Office, the disclosure of each of which is incorporated by reference herein in its entirety.

BACKGROUND

1. Field

The disclosure relates to unmanned aerial vehicles (UAVs). More particularly, the disclosure relates to a system and a method for flight management of a fleet of unmanned aerial vehicles.

2. Description of Related Art

Unmanned aerial vehicles (UAVs) or drones are aircraft which do not require any human pilot, crew, or passengers on board. There are multiple applications of UAVs, such as aerial photography, military, shipping and delivery, surveillance, entertainment, and the like. Further, UAVs have multiple advantages, such as cost effectiveness, high accuracy, easy deployment, and the like. The UAVs transmit their location coordinates and health parameters, such as battery life, to a ground station. The transmission of the location coordinates and the health parameters from the UAVs to the ground station via a cellular or mobile network ensures connectivity between the UAVs and the ground station for completing critical tasks, such as organ delivery for transplant.

In addition, there may be a delay in receiving the location coordinates and the health parameters from the UAVs to the ground stations due to one or more reasons, such as network congestion and bad weather conditions. During critical missions and emergency operations, a delay may lead to adverse events and failure to complete critical tasks. Diagnosing the reason for the delay and determining delay factors which caused the delay is an important concept for planning alternative actions to complete critical tasks. However, conventional UAV communication solutions fail to identify the reason for the delay and the delay factors. The conventional solutions also fail to decide whether the delay is temporary or the delay is for a prolonged time. Furthermore, the conventional solutions also fail to determine a next course of action when there is a delay beyond a predefined threshold limit.

FIG. 1 illustrates a pictorial representation 100 depicting communication between a UAV and a ground station, as per an existing technique according to the related art.

At operation 102, a UAV initiates a mission critical operation to deliver an organ to a hospital for transplantation. At operation 104, the UAV transmits its location coordinates to the ground station by using the cellular or mobile network. At operation 106, the UAV fails to transmit the location coordinates in a predefined interval due to a network outage. Further, at operation 108, a ground station does not receive the location coordinates in the desired interval and an alert mechanism is triggered. At operation 110, the ground station fails to determine the next course action to complete the mission critical operation. Further, the ground station also fails to determine in real-time if severity associated with the failure in receiving the location coordinates is critical or non-critical.

Accordingly, there is a need for a system and method to overcome the above-identified issues.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a selection of concepts, in a simplified format, that are further described in the detailed description of the disclosure. This summary is neither intended to identify key or essential inventive concepts of the disclosure and nor is it intended for determining the scope of the disclosure.

Additional aspects will be set forth in part in the description which follows and, in part, will be apparent from the description, or may be learned by practice of the presented embodiments.

In accordance with an example embodiment of the disclosure, a method for flight management of a fleet of unmanned aerial vehicles is provided. The method includes receiving, by a ground station, network data from at least one network operator. Further, the method includes determining, by the ground station, whether sensor data associated with the UAV is received from the UAV within a predefined time duration from an instance of previous reception of the sensor data. Furthermore, the method includes generating, by the ground station, a quality of communication (QoC) value associated with a communication between the ground station and the UAV based on the received network data upon determining that the sensor data is not received by the ground station within the predefined time duration. The method also includes determining, by the ground station, if the generated QoC value is within a predefined QoC range. Further, the method includes establishing, by the ground station, a communication between the ground station and the UAV by using an alternate communication channel upon determining that the QoC value is outside the predefined QoC range.

In accordance with an example embodiment of the disclosure, a method for flight management of a fleet of unmanned aerial vehicles is provided. The method includes monitoring, by a ground station, a reception of sensor data from the UAV. Further, the method includes receiving, by the ground station, network data from at least one network operator via one or more communication techniques. Furthermore, the method includes determining, by the ground station, whether the sensor data associated with the UAV is received from the UAV within a predefined time duration from an instance of previous reception of the sensor data. The method also includes generating, by the ground station, a QoC value associated with a communication between the ground station and the UAV based on the received network data and past sensor data upon determining that the sensor data is not received by the ground station within the predefined time duration. Further, the method includes determining, by the ground station, if the generated QoC value is within a predefined QoC range. The method includes determining, by the ground station, an estimated time of arrival (ETA) of the sensor data from the aerial vehicle to the ground station based on the generated QoC value upon determining that the QoC value is within the predefined QoC range. Furthermore, the method includes establishing, by the ground station, communication between the ground station and the UAV by using a mission critical push-to-talk (MCPTT) channel upon determining that the QoC value is outside the predefined QoC range.

In accordance with an example embodiment of the disclosure, a system for flight management of a fleet of unmanned aerial vehicles is provided. The system includes a memory and one or more processors communicatively coupled to the memory. The one or more processors are configured to receive network data from at least one network operator. The one or more processors are also configured to determine whether sensor data associated with the UAV is received from the UAV within a predefined time duration from an instance of previous reception of the sensor data. Further, the one or more processors are configured to generate a QoC value associated with a communication between the ground station and the UAV based on the received network data upon determining that the sensor data is not received by the ground station within the predefined time duration. The one or more processors are configured to determine if the generated QoC value is within a predefined QoC range. Furthermore, the one or more processors are configured to establish a communication between the ground station and the UAV by using an alternate communication channel upon determining that the QoC value is outside the predefined QoC range.

In accordance with an example embodiment of the disclosure, a system for flight management of a fleet of unmanned aerial vehicles is provided. The system includes a memory and one or more processors communicatively coupled to the memory. The one or more processors are configured to monitor the reception of sensor data from the UAV. Further, the one or more processors are configured to receive network data from at least one network operator via one or more communication techniques. The one or more processors are also configured to determine whether the sensor data associated with the UAV is received from the UAV within a predefined time duration from an instance of previous reception of the sensor data. Furthermore, the one or more processors are configured to generate a QoC value associated with a communication between the ground station and the UAV based on the received network data and past sensor data upon determining that the sensor data is not received by the ground station within the predefined time duration. The one or more processors are configured to determine if the generated QoC value is within a predefined QoC range. The one or more processors are also configured to determine an ETA of the sensor data from the aerial vehicle to the ground station based on the generated QoC value upon determining that the QoC value is within the predefined QoC range. Further, the one or more processors are configured to establish a communication between the ground station and the UAV by using an MCPTT channel upon determining that the QoC value is outside the predefined QoC range.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Figure 1:
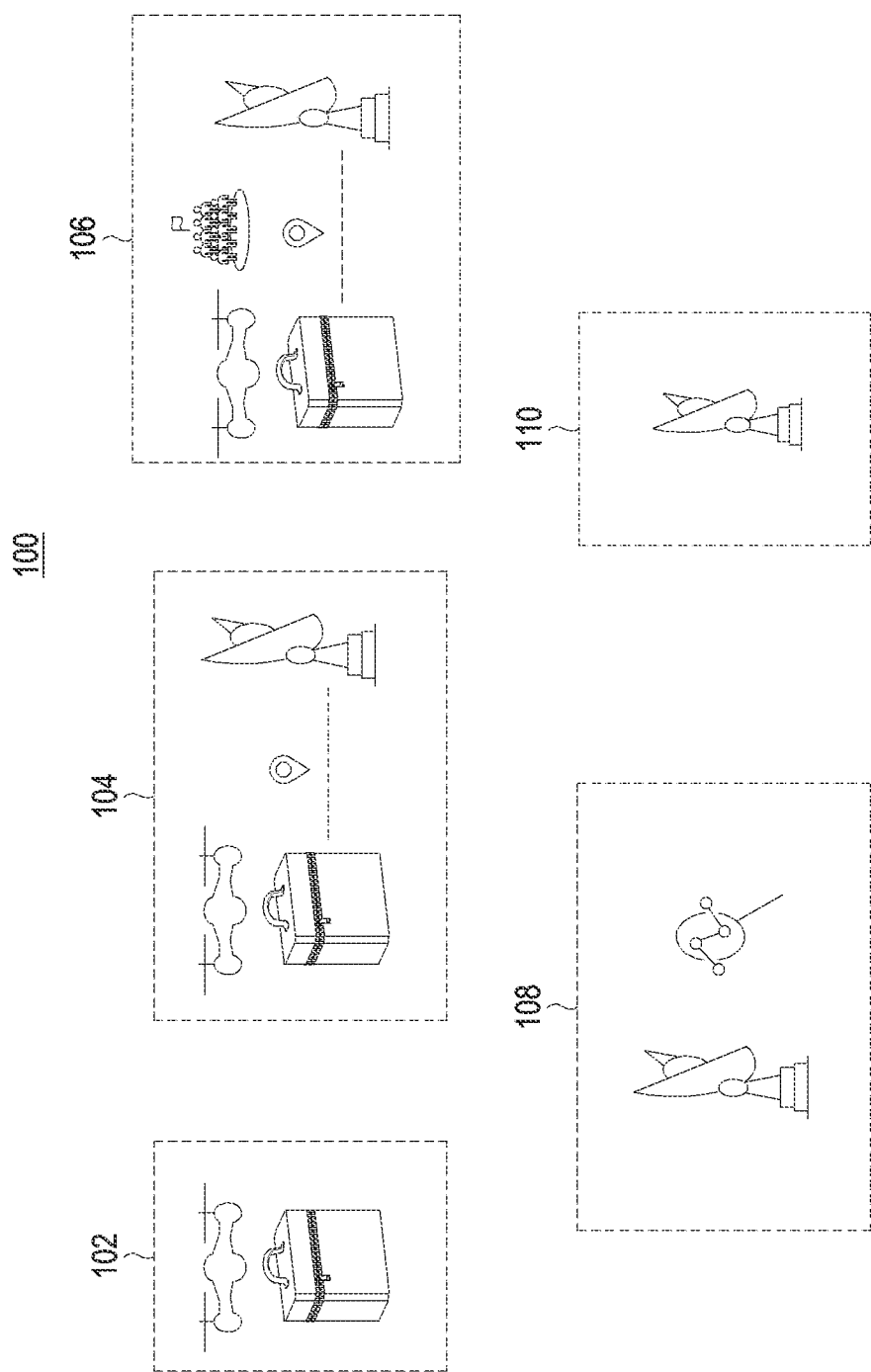
FIG. 1 illustrates a pictorial representation depicting communication between an unmanned aerial vehicle (UAV) and a ground station, as per an existing technique according to the related art.
Figure 2:
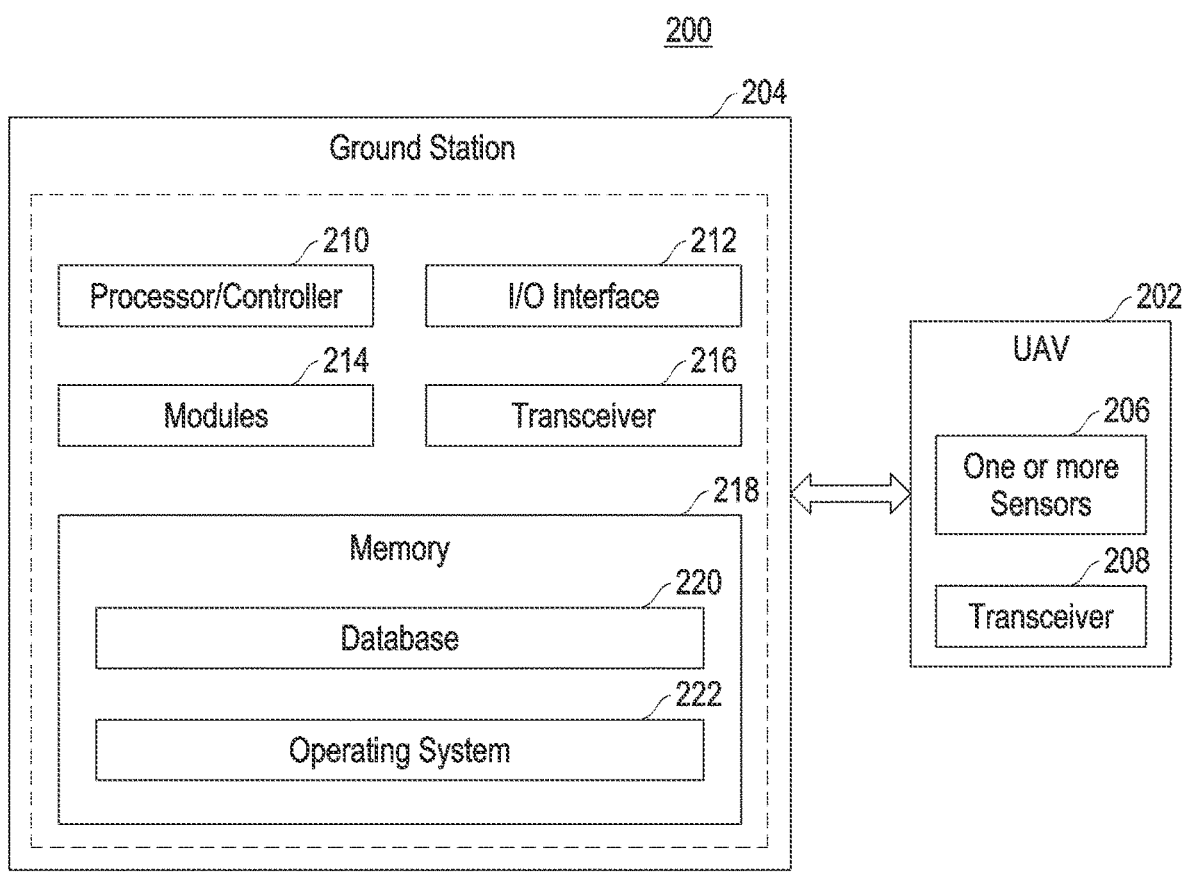
FIG. 2 illustrates a block diagram of a UAV and a system at a ground station, according to an example embodiment of the disclosure.

FIG. 2 illustrates a block diagram 200 of an unmanned aerial vehicle (UAV) 202 and a system at a ground station 204, according to an example embodiment of the disclosure. By way of example, the UAV 202 may be a multi-rotor drone, a fixed-wing drone, a single-rotor drone, a fixed-wing hybrid vertical take-off, a landing vertical take-off and landing (VTOL), or any other UAV that transmits sensor data to the ground station 204 over a plurality of cellular networks or mobile networks, such as a third generation (3G), fourth generation (4G), a fifth generation (5G) or pre-5G, sixth generation (6G) network or any future wireless communication network. In an example embodiment of the disclosure, the transmission of the sensor data ensures connectivity between the UAV 202 and the ground station 204 for completing critical tasks, such as, but not limited to, organ delivery for transplant, package/food delivery, and the like. In an embodiment of the disclosure, the network data includes weather data, geospatial data, network congestion data, network outage data, or any combination thereof. In an embodiment of the disclosure, the sensor data includes, but not limited to, location coordinates of the UAV 202 and a condition of one or more equipment of the UAV 202. For example, the one or more equipment includes one or more sensors, a battery of the UAV 202, and the like.

In one embodiment of the disclosure, the UAV 202 includes one or more sensors 206 for capturing the sensor data. In an example, the one or more sensors 206 may include a global positioning system (GPS), a temperature sensor, and the like. The UAV 202 includes a transceiver 208 for transmitting the captured sensor to the ground station 204 via the plurality of cellular networks or mobile networks.

In an example embodiment, the system at the ground station 204 may include one or more processors/controllers 210, an input/output (I/O) interface 212, modules 214, a transceiver 216, and a memory 218.

In an example embodiment, the one or more processors/controllers 210 may be operatively coupled to each of the respective I/O interface 212, the modules 214, the transceiver 216, and the memory 218. In one embodiment, the one or more processors/controllers 210 may include at least one data processor for executing processes in Virtual Storage Area Network. For example, the one or more processors/controllers 210 may include specialized processing units such as integrated system (bus) controllers, memory management control units, floating point units, graphics processing units, digital signal processing units, etc. In one embodiment, the one or more processors/controllers 210 may include a central processing unit (CPU), a graphics processing unit (GPU), or both. In an example, the one or more processors/controllers 210 may be one or more general processors, digital signal processors, application-specific integrated circuits, field-programmable gate arrays, servers, networks, digital circuits, analog circuits, combinations thereof, or other now known or later developed devices for analyzing and processing data. The one or more processors/controllers 210 may be configured to execute a software program, such as code generated manually (i.e., programmed) to perform the desired operation. In an example embodiment of the disclosure, the processors/controllers 210 may be a general purpose processor, such as the CPU, an application processor (AP), or the like, a graphics-only processing unit such as the GPU, a visual processing unit (VPU), and/or an AI-dedicated processor such as a neural processing unit (NPU).

The processors/controllers 210 may control the processing of input data in accordance with a predefined operating rule or ML model stored in the non-volatile memory and the volatile memory. The predefined operating rule or the ML model is provided through training or learning.

Being provided through learning means that, by applying a learning technique to a plurality of learning data, a predefined operating rule or the ML model of a desired characteristic is made. In an example embodiment, the learning may be performed in a device itself in which ML according to an example embodiment is performed, and/or may be implemented through a separate server/system.

The ML model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), deep Q-network, and the like.

The learning technique may be a method for training a predetermined target device (for example, a robot) using a plurality of learning data to cause, allow, or control the target device to make a determination or prediction. Some examples of learning techniques include, but are not limited to, supervised learning, unsupervised learning, semi-supervised learning, or reinforcement learning.

The one or more processors/controllers 210 may, for example, be disposed in communication with one or more input/output (I/O) devices via the respective I/O interface 212. The I/O interface 212 may employ communication code-division multiple access (CDMA), high-speed packet access (HSPA+), global system for mobile communications (GSM), long-term evolution (LTE), WiMax, or the like, etc.

Using the I/O interface 212, the ground station 204 may, for example, communicate with one or more I/O devices, specifically, the user devices associated with the human-to-human conversation. In an example, the input device may be an antenna, microphone, touch screen, touchpad, storage device, transceiver, video device/source, etc. The output devices may be a printer, fax machine, video display (e.g., cathode ray tube (CRT), liquid crystal display (LCD), light-emitting diode (LED), plasma, plasma display panel (PDP), organic light-emitting diode display (OLED) or the like), audio speaker, etc.

The one or more processors/controllers 210 may, for example, be disposed in communication with a communication network via a network interface. In an embodiment, the network interface may be the I/O interface 212. The network interface may connect to the communication network to enable connection of the ground station 204 with the outside environment including the UAV 202. In an example embodiment, the network interface may employ connection protocols including, without limitation, direct connect, Ethernet (e.g., twisted pair 10/100/1000 Base T), transmission control protocol/internet protocol (TCP/IP), token ring, institute of electrical and electronics engineers (IEEE) 802.11a/b/g/n/x, etc. The communication network may include, without limitation, a direct interconnection, local area network (LAN), wide area network (WAN), wireless network (e.g., using wireless application protocol), the Internet, and the like.

In various embodiments, the memory 218 may be communicatively coupled to the one or more processors/controllers 210. The memory 218 may be configured to store data, and instructions executable by the one or more processors/controllers 210. In an example, the data may be the network data and the sensor data. In one embodiment, the memory 218 may communicate via a bus within the ground station 204. The memory 218 may include, but not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory may include a cache or random-access memory for the one or more processors/controllers 210. In other examples, the memory 218 is separate from the one or more processors/controllers 210, such as a cache memory of a processor, the system memory, or other memory. The memory 218 may be configured as an external storage device or database for storing data. The memory 218 may be operable to store instructions executable by the one or more processors/controllers 210. The functions, acts, or tasks illustrated in the figures or described may be performed by the programmed processor/controller for executing the instructions stored in the memory 218. In an example, the functions, acts or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like.

In various embodiments, the modules 214 may be included within the memory 218. The memory 218 may further include a database 220 to store data. The modules 214 may include a set of instructions that may be executed to cause the ground station 204 to perform any one or more of the methods/processes disclosed herein. The modules 214 may, for example, be configured to perform the steps of the disclosure using the data stored in the database 220 for flight management of a fleet of the UAVs, as discussed herein. In an embodiment, each of the modules 214 may be a hardware unit which may be outside the memory 218. In addition, the memory 218 may include an operating system 222 for performing one or more tasks of the ground station 204, as performed by a generic operating system in the communications domain. The transceiver 216 may be configured to receive and/or transmit signals to and from the ground station 204. In an embodiment, the database 220 may be configured to store the information as required by the modules 214 and the one or more processors/controllers 210 for flight management of the fleet of the UAVs.

In an example embodiment of the disclosure, at least one of the modules may 213 be implemented through the ML model. A function associated with the ML may be performed through the non-volatile memory, the volatile memory, and the processor.

In an example embodiment, the I/O interface 212 may enable input and output to and from the ground station 204 using suitable devices such as, but not limited to, a display, a keyboard, a mouse, a touch screen, a microphone, a speaker and so forth.

The disclosure also contemplates a computer-readable medium that includes instructions or receives and executes instructions responsive to a propagated signal. In an example, the instructions may be transmitted or received over the network via a communication port or interface or using a bus (not shown). The communication port or interface may be a part of the one or more processors/controllers 210 or may be a separate component. In an example, the communication port may be created in software or may be a physical connection in hardware. The communication port may, for example, be configured to connect with a network, external media, the display, or any other components in the ground station 204, or combinations thereof. The connection with the network may be a physical connection, such as a wired Ethernet connection, or may be established wirelessly. Likewise, the additional connections with other components of the ground station 204 may be physical or may be established wirelessly. The network may, for example, alternatively be directly connected to the bus. For the sake of brevity, the architecture and standard operations of the operating system 222, the memory 218, the database 220, the one or more processors/controllers 210, the transceiver 216, and the I/O interface 212 are not discussed in detail.

Figure 3:
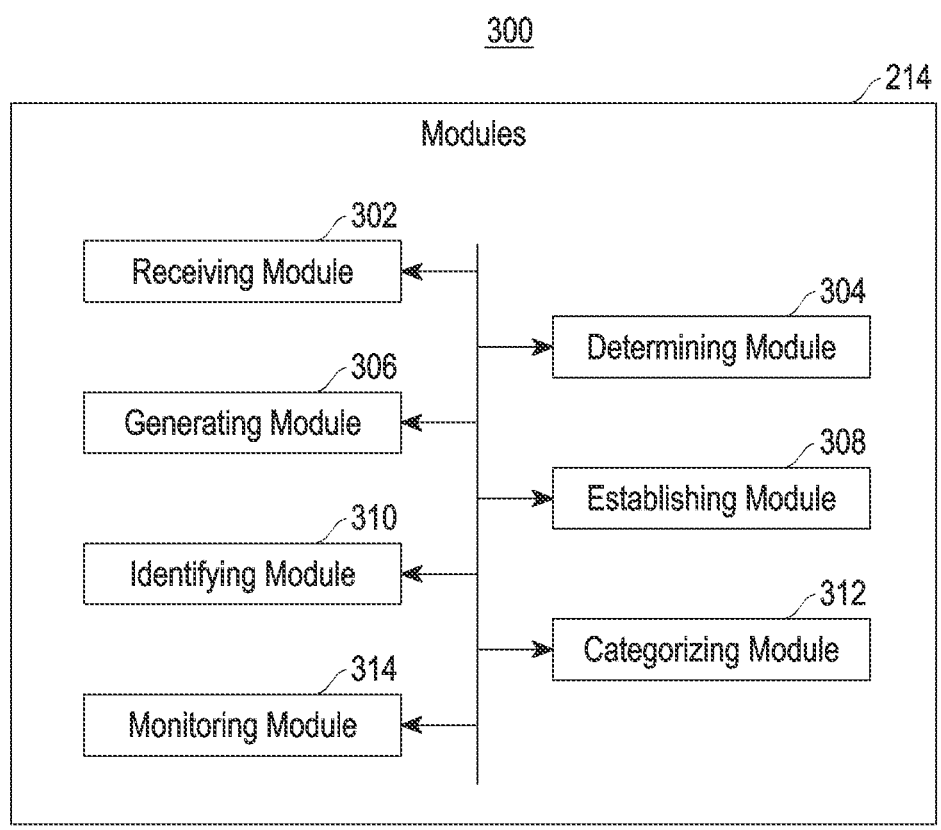
FIG. 3 illustrates a block diagram of modules of a system at a ground station for flight management of a fleet of UAVs according to an example embodiment of the disclosure.

FIG. 3 illustrates a block diagram 300 of modules 214 of a system at a ground station 204 for flight management of a fleet of UAVs, according to an example embodiment of the disclosure. In an example embodiment of the disclosure, the UAV 202 is an aircraft which does not require any human pilot, crew, or passengers on board. The illustrated embodiment of FIG. 3 also depicts a sequence flow of process among the modules 214 for flight management of the fleet of the UAVs. In an example embodiment of the disclosure, the modules 214 may include, but not limited to, a receiving module 302, a determining module 304, a generating module 306, an establishing module 308, an identifying module 310, and a categorizing module 312. In an example embodiment of the disclosure, the modules 214 may also include a monitoring module 314. The modules 214 may be implemented by way of suitable hardware and/or software applications.

In one embodiment of the disclosure, the receiving module 302 of the ground station 204 is configured to receive network data from one or more network operators. For example, the one or more network operators may include mobile, cellular station, and the like. In an example embodiment of the disclosure, the network data includes weather data/weather and climatic conditions, geospatial data, network congestion data, network outage data, or any combination thereof. In an example, the weather data may include climatic and weather conditions, such as rain, hailstorm, snow with ice crystals, drizzle, high wind, sleet, precipitation rate, and the like. In an example embodiment of the disclosure, the geospatial data corresponds to information associated objects, events, or phenomena having a location on the surface of the earth. In an example, geospatial data may include coordinate information (e.g., latitude and longitude), identification of tall buildings in particular coordinates, and the like. In an example embodiment of the disclosure, the network congestion may occur due to one or more reasons, such as crowded locations, road accidents, shopping area, political rallies, seasonal festival, and the like. In an embodiment of the disclosure, the network outage may be due to riots zone, violence zone, military zone, and the like. In an example, one or more obstacles between the aerial vehicle and the ground station 204 may be buildings, trees, human beings, animals, and the like. In an example embodiment of the disclosure, the network data is received from the one or more network operations via one or more communication techniques, such as cellular networks, mobile networks, and the like.

According to an example embodiment, the determining module 304 is configured to determine whether sensor data associated with the UAV 202 is received from the UAV 202 within a predefined time duration from an instance of previous reception of the sensor data. In an example embodiment of the disclosure, the sensor data is received from the one or more network operations via the one or more communication techniques. In an example embodiment of the disclosure, the sensor data includes location coordinates of the UAV 202 and a condition of one or more equipments of the UAV 202. In an example embodiment of the disclosure, the location coordinates are received via UAV's GPS location or UAV connection to cellular networks. In an example embodiment of the disclosure, a location of the UAV 202 may be determined based on the location coordinates for determining one or more factors that affect communication link in the determined location of the UE. For example, a mass gathering of people in a shopping zone, a festival, and the like may have more people connected to a particular base station beyond an estimated capacity to be allowed in that location. In such cases, UAV communication link delay may occur for a limited time, until the UAV 202 crosses that particular base station. In an example embodiment of the disclosure, the condition of the one or more equipment may include, but not limited to, low battery, damaged sensors, failure of the one or more equipment, damage in the one or more equipment, and the like. In an example embodiment of the disclosure, the one or more equipments includes, but not limited to, one or more sensors, a battery of the UAV 202, and the like.

According to an example embodiment, the generating module 306 is configured to generate a quality of communication (QoC) value associated with a communication between the ground station 204 and the UAV 202 based on the received network data upon determining that the sensor data is not received by the ground station 204 within the predefined time duration. In generating the QoC value, the generating module 306 may be configured to determine one or more delay factors responsible for an unsuccessful reception of the sensor data from the UAV 202 within the predefined time duration based on past sensor data, a flight path of the UAV 202, past network data, the received network data, or any combination thereof. In an example embodiment of the disclosure, the past sensor data corresponds to the sensor data received before the predefined time duration. In an example, the one or more delay factors include weather and climatic conditions, the network congestion, the network outage, the one or more obstacles between the UAV 202 and the ground station 204, the condition of one or more equipments of the UAV 202, or any combination thereof. The generation module generates the QoC value based the detected on one or more delay factors, the past sensor data, the past network data, a predefined weightage associated with each of the one or more delay factors, the received network data, a set of past QoC values, a set of past ETA values associated with the UAV 202, or any combination thereof. For example, the past network data may be historic weather pattern.

According to an example embodiment of the disclosure, the QoC value is a single numerical score in range of 0 to 1 generated by autonomously assigning weights to different data points associated with the network data by using a machine learning (ML)-based communication quality analyser. A lower QoC value indicates degraded flight conditions leading to delayed operation of the UAV. The generated QoC value is used to determine a baseline estimate of an expected delay in the operation.

According to an example embodiment, the determining module 304 is configured to determine if the generated QoC value is within a predefined QoC range by comparing the generated QoC value with the predefined QoC range. In an embodiment if the disclosure, the predefined QoC range is from 0 to 1.

In an embodiment, the establishing module 308 is configured to establish a communication between the ground station 204 and the UAV 202 by using an alternate communication channel upon determining that the QoC value is outside the predefined QoC range. In an example embodiment of the disclosure, the alternate communication channel corresponds to a mission critical push-to-talk (MCPTT) channel. In an example embodiment of the disclosure, the MCPTT refers to a push-to-talk product functionality that meets the requirements for public safety mission-critical voice communication. The MCPTT channel includes high availability, reliability, low-latency, support for group calls and 1:1 calls, talker identification, device-to-device direct communications, emergency calling, clear audio quality, and the like.

In an example embodiment of the disclosure, the determining module 304 is configured to determine an estimated time of arrival (ETA) of the sensor data from the UAV 202 to the ground station 204 based on the generated QoC value upon determining that the QoC value is within the predefined QoC range.

According to an embodiment, the generating module 306 is configured to generate one or more alert notifications recommending initiation of recovery operation for locating the UAV 202 when the sensor data is not received from the UAV 202 within the determined/estimated ETA or the communication is not established between the ground station 204 and the UAV 202 by using the alternate communication channel. According to an example embodiment of the disclosure, the one or more alert notifications are received by fleet operators to initiate the recovery operation for locating the UAV 202.

According to an example embodiment, the generating module 306 is configured to generate a discrete QoC value associated with each of the one or more delay factors based on the flight path of the UAV 202, the received network data, the set of past QoC values captured during fleet operations, the set of past ETA values associated with the UAV 202, or any combination thereof. In an example embodiment of the disclosure, the ground station 204 automatically decides and suppress non-critical events based on the generated discrete QoC value associated with each of the one or more delay factors. The details on generating the discrete QoC value have been elaborated in subsequent paragraphs of the description with reference to FIG. 6.

The generating module 306 may be configured to identify a delay category associated with each of the one or more delay factors by analysing the generated discrete QoC value and the predefined QoC range. In one embodiment of the disclosure, the delay category is a critical category or a non-critical category. In an example embodiment of the disclosure, in a non-critical category, the generated discrete QoC value is within the predefined QoC range i.e., 0 to 1. Further, in the critical category, the generated discrete QoC value is nearly 0. In an example, the one or more delay factors associated with the non-critical category include network congestion in particular location coordinates for a few seconds, communication delay due to weather, and the like. In an example, the one or more delay factors associated with the critical category includes accident, failure of sensors, failure of a battery, network outage due to riots, and the like. The generating module 306 is configured to determine the ETA of the sensor data from the UAV 202 based on the generated discrete QoC value when the identified delay category is the non-critical category. In an example embodiment, the generating module 306 is configured to establish a communication between the ground station 204 and the UAV 202 by using the alternate communication channel when the identified delay category is the critical category. In an example embodiment, the ground station 204 also determines the ETA in relaying the sensor data to the ground station 204 based on the generated discrete QoC value. The details on identification of the delay category associated with each of the one or more delay factors have been elaborated in subsequent in subsequent paragraphs of the description with reference to FIG. 5.

The identifying module 310 is configured to identify the one or more delay factors responsible for unsuccessful reception of the sensor data from the UAV 202 based on the generated discrete QoC value, the location coordinates of the UAV 202, and the predefined QoC range. In one embodiment of the disclosure, the one or more delay factors are responsible for degrading the QoC resulting in delay in communication from UAV 202 and throughout the course of travel of the UAV 202. In an example embodiment, the identifying module 310 is configured to categorize a delay in reception of the sensor data from the UAV 202 to the ground station 204 into the critical category or the non-critical category based on the generated discrete QoC value, the predefined QoC range, the identified one or more delay factors, or any combination thereof. In an example embodiment of the disclosure, the discrete QoC value of the critical category and the non-critical category may range between 0 and 1. A comparison of the discrete QoC value with a pre-established threshold helps the operator to take next a set of actions, such as waiting for the sensor data, initiate the recovery operation, and the like. When the discrete QoC value is within the predefined QoC range, alerts are not generated for the recovery operation. When the discrete QoC value is nearly 0, the ground station 204 switches to MCPTT to re-establish the communication link with the UAV 202 on failing to establish the communication between UAV 202 and ground station 204. In an example embodiment of the disclosure, alert systems associated with the ground station 204 sends a notification to feet operator and initiates recovery operation to prevent further disasters.

The categorizing module 312 categorizes a delay in reception of the sensor data from the UAV 202 to the ground station 204 into the critical category or the non-critical category based on the generated QoC value and the predefined QoC range. According to an example embodiment of the disclosure, the non-critical category indicates the delay in reception of the sensor data from the UAV 202 is temporary and communication between the UAV 202 and the ground station 204 is predicted to be re-established via a base station in the flight path of the UAV 202. Further, the critical category indicates an irrecoverable link loss, such as sensor failure.

According to an example embodiment, the sensor data, the flight path of the UAV 202, and the network data are stored in a UAV-based blockchain network for performing analytics and providing a dashboard view to fleet operators. According to an example embodiment of the disclosure, storage of the sensor data, the flight path and the network data in the UAV-based blockchain network may be used to address issues associated with the condition of the one or more equipment, communication lag, and a violation of a path of the UAV 202. According to an example embodiment of the disclosure, the analytics may include comparing fleet efficiency of different operators, determining a percentile of a particular flight instance, historical comparisons to determine if operations are improving, determining an impact of topology changes (like construction of new buildings) on fleet operation, and the like.

In an example embodiment of the disclosure, the monitoring module 314 of the ground station 204 monitors a reception of the sensor data from the UAV 202.

In an embodiment, the receiving module 302 receives the network data from the one or more network operators via the one or more communication techniques.

The determining module 304 determines whether the sensor data associated with the UAV 202 is received from the UAV 202 within the predefined time duration from an instance of previous reception of the sensor data.

In an example embodiment, the generating module 306 generates the QoC value associated with a communication between the ground station 204 and the UAV 202 based on the received network data and the past sensor data upon determining that the sensor data is not received by the ground station 204 within the predefined time duration.

The determining module 304 is configured to determine if the generated QoC value is within a predefined QoC range by comparing the generated QoC value with the predefined QoC range. Further, the determining module 304 is configured to determine the ETA of the sensor data from the aerial vehicle to the ground station 204 based on the generated QoC value upon determining that the QoC value is within the predefined QoC range. In an example embodiment of the disclosure, the ETA is determined by using the ML-based communication quality analyser. The details on the ML-based communication quality analyser have been elaborated in subsequent paragraphs of the description with reference to FIGS. 7, 8, 9A, and 9B.

In an example embodiment, the establishing module 308 establishes a communication between the ground station 204 and the UAV 202 by using the MCPTT channel upon determining that the QoC value is outside the predefined QoC range. The details on establishing the communication between the ground station 204 and the UAV 202 by using the MCPTT channel have been elaborated in subsequent paragraphs of the description with reference to FIG. 4.

In a use-case scenario, the UAV 202 takes off for a mission-critical operation to deliver an organ for transplant. The UAV 202 periodically relays the sensor data including its location coordinates to the ground station 204. During the fleet operation, the UAV 202 may lose communication link to the ground station 204. In the ground station 204, the QOC is generated based on the network data. The ETA is determined based on the QoC. Further, the ground station 204 determines that the generated QoC value is within a predefined QoC range, and the communication link failure is not critical. The ground station 204 automatically suppresses further notifications. The details on the operation of the ground station 204 for flight management of the fleet of the UAVs have been elaborated in subsequent paragraphs of the description with reference to FIGS. 10 and 11.

In one embodiment of the disclosure, the ground station 204 learns from a past fleet of operations, the past network data, or a combination thereof from operators and analyzes the QoC to determine one or more actions to be taken by the ground station 204 for improving the QoC, such as determining the ETA, switching to the MCPTT channel, and the like.

Figure 4:
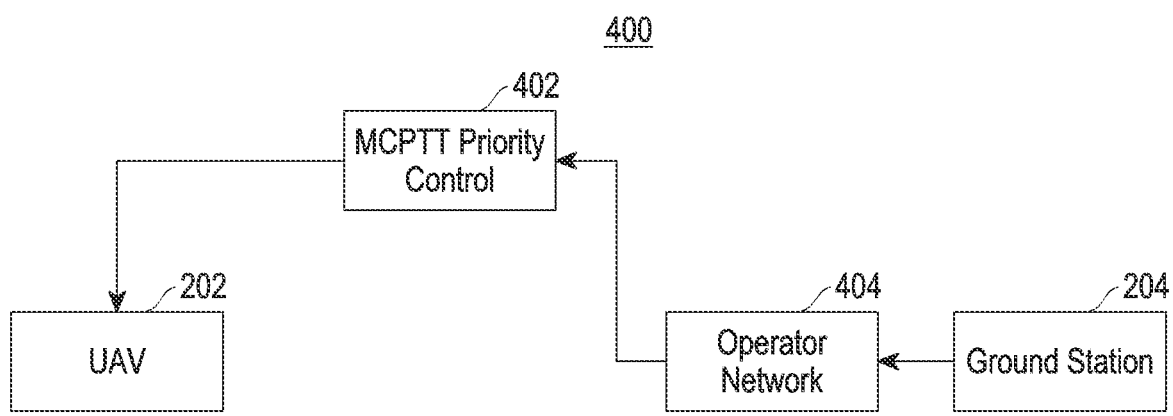
FIG. 4 illustrates a block diagram for establishing a communication between a ground station and a UAV by using Mission-Critical Push-To-Talk (MCPTT), according to an example embodiment of the disclosure.

FIG. 4 illustrates a block diagram 400 for establishing a communication between a ground station 204 and a UAV 202 by using the MCPTT, according to an example embodiment of the disclosure.

When the determining module 304 of the ground station 204 determines that the QoC value is critically low as compared to the predefined QoC range, the establishing module 308 re-establish the communication path between the UAV 202 and ground station 204 by using an MCPTT priority 402 control and an operator network 404. In one embodiment of the disclosure, the QoC value is critically low if the value of the QoC value is nearly 0. In an example embodiment of the disclosure, a network mode of the UAV 202 is switched to MCPTT to re-establish the communication link between the UAV 202 and ground station 204.

In an example embodiment, the ground station 204 sends the one or more alert notifications for notifying the fleet operator to initiate the recovery operation for locating the UAV 202 upon failure to re-establish the communication link between the ground station 204 and the UAV 202 within the ETA.

Figure 5:
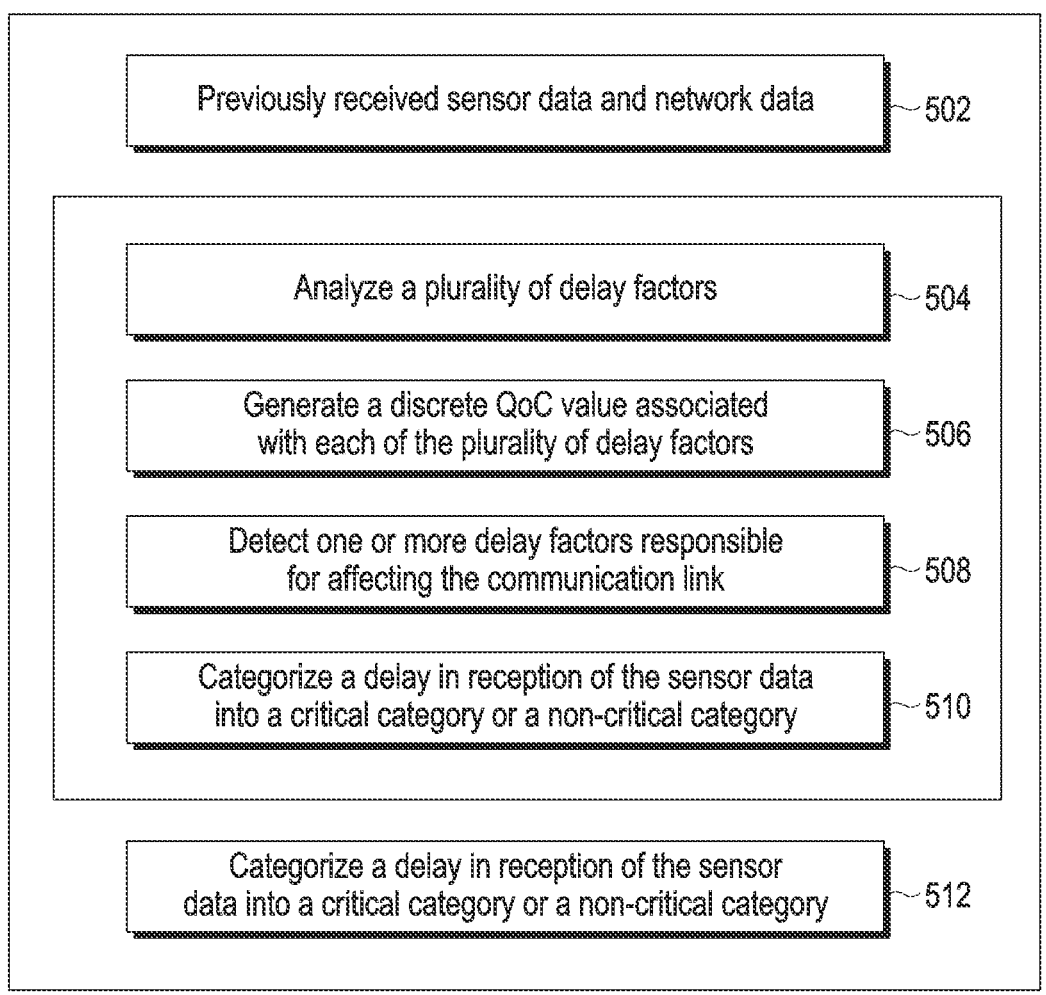
FIG. 5 illustrates a block diagram for identifying a delay category associated with each of one or more delay factors, according to an example embodiment of the disclosure.

FIG. 5 illustrates a block diagram 500 for identifying a delay category associated with each of one or more delay factors, according to an example embodiment of the disclosure.

At operation 502, the ground station 204 receives the network data from one or more network operators via wireless fidelity (Wi-Fi), mobile, and the like. In an embodiment, the ground station 204 also receives the sensor data from the UAV 202. Further, the ground station 204 determines that the sensor data is not received from the UAV 202 within a predefined time duration from an instance of previous reception of the sensor data. At operation 504, the ground station 204 analyses a plurality of delay factors in the path of the UAV 202 which may be responsible for the unsuccessful reception of the sensor data from the UAV 202. In an example, the plurality of delay factors may include weather and climatic conditions, the network congestion, the network outage, the one or more obstacles between the UAV 202 and the ground station 204, the condition of one or more equipment of the UAV 202, or any combination thereof. At operation 506, the ground station 204 generates the discrete QoC value associated with each of the plurality of delay factors. At operation 508, the ground station 204 detects the one or more delay factors from the plurality of delay factors responsible for affecting the communication link between the ground station 204 and the UAV 202 resulting in unsuccessful reception of the sensor data from the UAV 202. At operation 510, the ground station 204 categorizes the delay in reception of the sensor data from the UAV 202 to the ground station 204 into the critical category or the non-critical category based on the generated discrete QoC value, the predefined QoC range, the identified one or more delay factors, or any combination thereof. When the discrete QoC value is less than the predefined QoC range, the ground station 204 performs a preventive recovery operation or a fall back mechanism for switching the UAV 202 to MCPTT to re-establish the communication link with the UAV 202 at operation 512.

Figure 6:
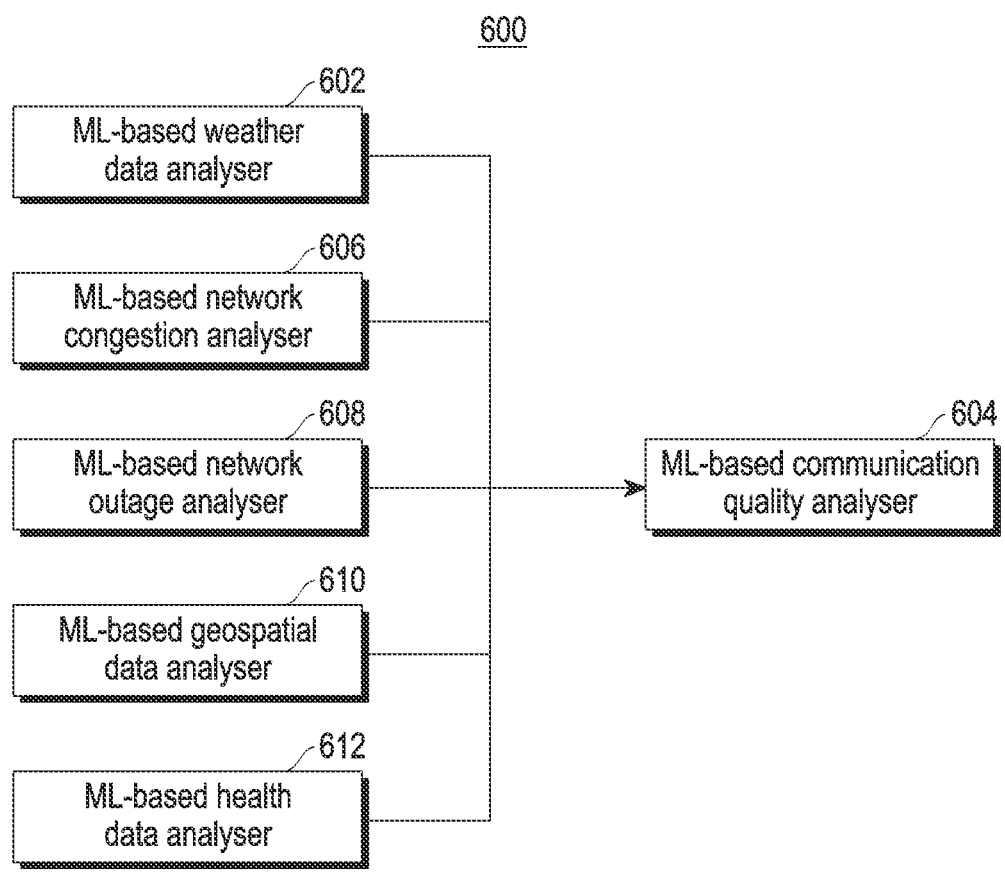
FIG. 6 illustrates a block diagram for generating discrete QoC values, according to an example embodiment of the disclosure.

FIG. 6 illustrates a block diagram 600 for generating discrete QoC values, according to an example embodiment of the disclosure.

In one embodiment of the disclosure, an ML-based weather data analyser 602 is configured to identify and analyse the weather and climatic conditions in a flight path of the UAV 202 which may affect the communication link between the UAV 202 and the ground station 204 based on predefined parameters and previous data, such that the ML-based communication quality analyser 604 may generate the discrete QoC value for the weather and climatic conditions. In an example, if during a past operation of the UAV, the high wind speeds resulted in an additional delay of 10 minutes then the ML-based communication quality analyser 604 may estimate a similar delay for comparable wind speeds. In an example embodiment, an ML-based network congestion analyser 606 is configured to analyse a network communication channel in the flight path of the UAV 202 and derives one or more congestion factors which may affect the network communication channel by using one or more parameters in the operator data. In an example embodiment of the disclosure, the one or more congestion factors may include a mass gathering of people due to a seasonal festival, political rallies, protest, and the like. For example, the one or more parameters include call setup success rate (CSSR), BH traffic for prediction, and the like. Further, an ML-based communication quality analyser 604 may generate the discrete QoC value for the network congestion based on a result of the analysing and the one or more congestion parameters. An ML-based network outage analyser 608 or an ML-based network interruption analyser is configured to analyse the network communication channel in the flight path of the UAV 202 and derives one or more outage factors which may cause blockage of the cellular or mobile network in a particular location, such that the ML-based communication quality analyser 604 may generate the discrete QoC value for the network outage. In an example embodiment of the disclosure, the one or more outage factors may include riots zone, natural calamities, violence zone, military zone, and the like. In addition, an ML-based geospatial data analyser 610 is configured to analyse and pre-process the geospatial data, such that the ML-based communication quality analyser 604 may generate the discrete QoC value for the geospatial data. For example, the ML-based geospatial data analyser 610 may analyse the presence of tall buildings and the objects that may intrude in the network communication channel. In an example, an ML-based health data analyser 612 is configured to analyse and pre-process the condition of one or more equipment of the UAV 202, such that the ML-based communication quality analyser 604 may generate the discrete QoC value for the condition of the one or more equipment. For example, the ML-based health data analyser 612 analyses the failure of equipment based on the one or more sensors 206. Further, a delay in communication between the UAV 202 and the ground station 204 is categorized into the critical category and the non-critical category and the QoC values are generated based on a result of the categorization. One or more actions are performed based on the generated QoC values, such as establishing the communication between the ground station 204 and the UAV 202 by using the alternate communication channel, determining the ETA, and the like.

In an example embodiment of the disclosure, the ML-based communication quality analyser 604 assigns a weightage to each of the weather and climatic conditions, the network congestion, the network outage, the geospatial data, and the condition of the one or more equipment. The ML-based communication quality analyser 604 generates the QoC value based on the assigned weightage. One or more actions are performed based on the generated QoC value.

Figure 7:
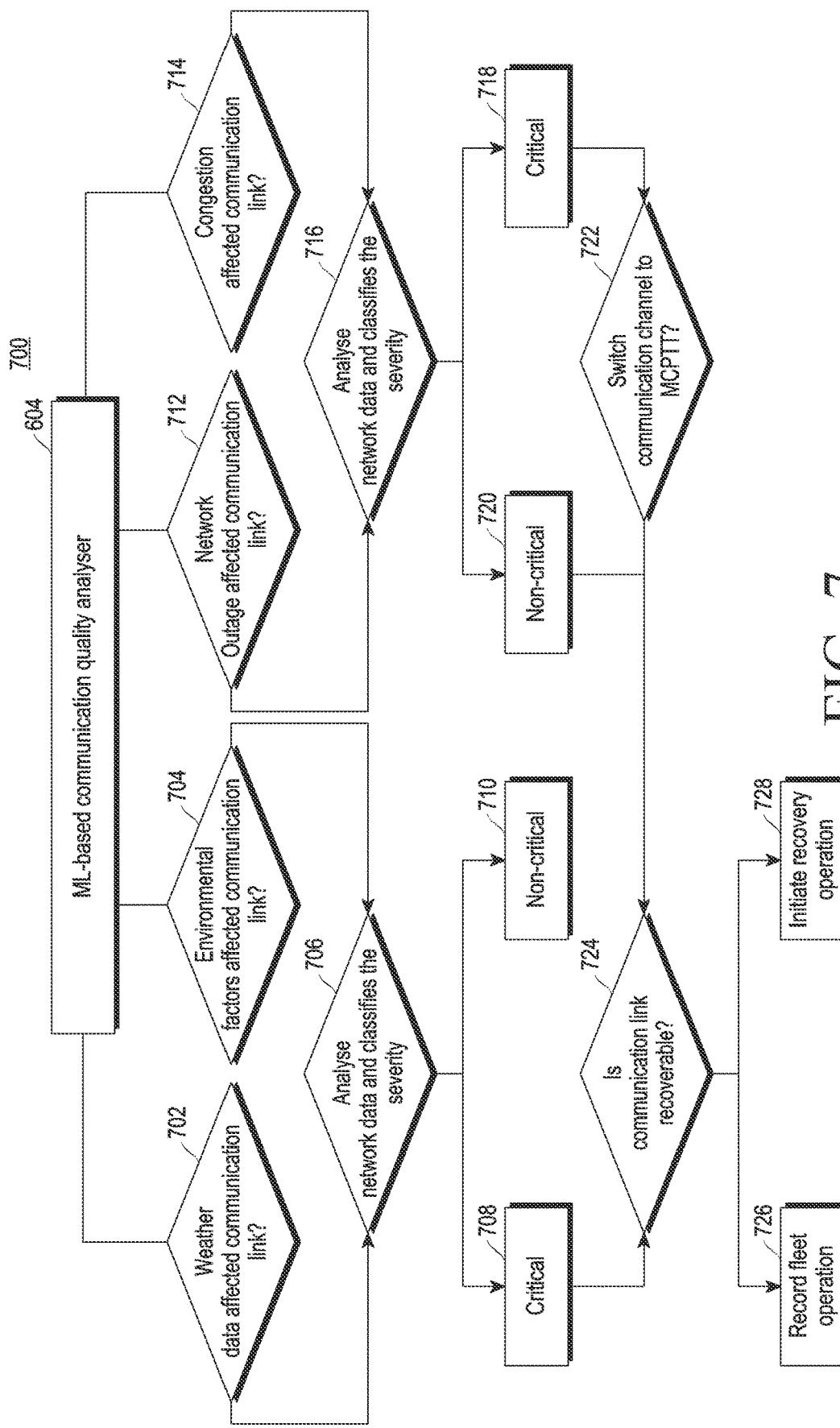
FIG. 7 illustrates a process flow diagram for performing one or more actions by using a machine learning (ML)-based communication quality analyser, according to an example embodiment of the disclosure.

FIG. 7 illustrates a process flow diagram 700 for performing one or more actions by using a ML-based communication quality analyser 604, according to an example embodiment of the disclosure.

At operation 702, the ML-based communication quality analyser 604 determines if the weather and climatic conditions affected the communication link between the ground station 204 and the UAV 202. At operation 704, the ML-based communication quality analyser 604 determines if environmental factors, such as wind speed, temperature, humidity, rainfall, time of day, and the like, affected the communication link. At operation 706, the ML-based communication quality analyser 604 analyses the network data and classifies the severity associated with the weather and climatic conditions, the environmental factors, or a combination thereof into the critical category 708 or the non-critical category 710.

At operation 712, the ML-based communication quality analyser 604 determines if the network outage affected the communication link. At operation 714, the ML-based communication quality analyser 604 determines if the network outage affected the communication link. At operation 716, the ML-based communication quality analyser 604 analyses the network data and classifies the severity associated with the network outage, the network congestion, or a combination thereof into the critical category 718 or the non-critical category 720.

At operation 722, it is determined if the network mode of the UAV 202 is required to be switched to MCPTT for re-establishing the communication link. At operation 724, it determined if the communication link is recoverable. Further, the ground station 204 performs the one or more actions to re-establish the communication link, such as recording fleet operation 726, and initiating recovery operations 728.

Figure 8:
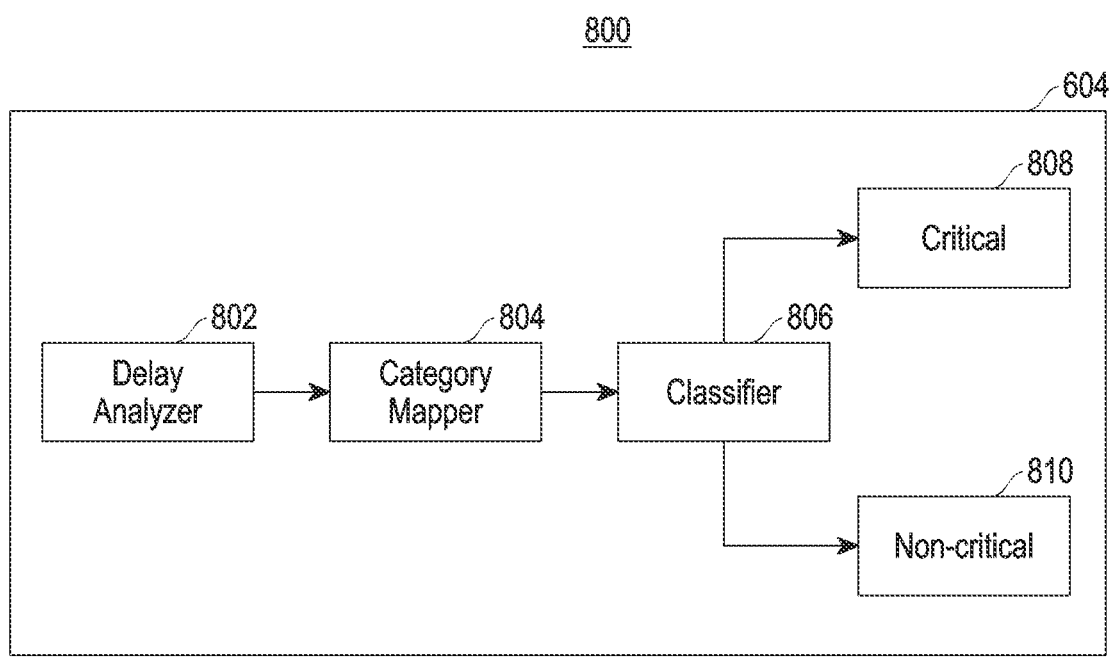
FIG. 8 illustrates a block diagram for categorizing a delay in communication between a UAV and a ground station, according to an example embodiment of the disclosure.

FIG. 8 illustrates a block diagram 800 for categorizing a delay in communication between a UAV 202 and a ground station 204, according to an example embodiment of the disclosure.

In one embodiment of the disclosure, the ML-based communication quality analyzer determines the one or more delay factors which may affect the quality of communication between the UAV 202 and the ground station 204. In an example embodiment, the ML-based communication quality analyzer determines the one or more delay factors when there is delay in the communication link of the UAV 202 and the ground station 204 with a previous reception of the sensor data from the UAV 202. The ML-based communication quality analyzer includes a delay analyzer 802, a category mapper 804, and a classifier 806. In an example embodiment, the delay analyzer 802 analyses the previously received sensor data and the flight path of the UAV 202. Further, the category mapper 804 categorizes the delay in reception of the sensor data into the one or more delay factors based on a result of analysis. In an example embodiment, the classifier 806 classifies the delay in reception of the sensor data into the critical category 808 or the non-critical category 810 based on a result of the mapping.

Figure 9A:
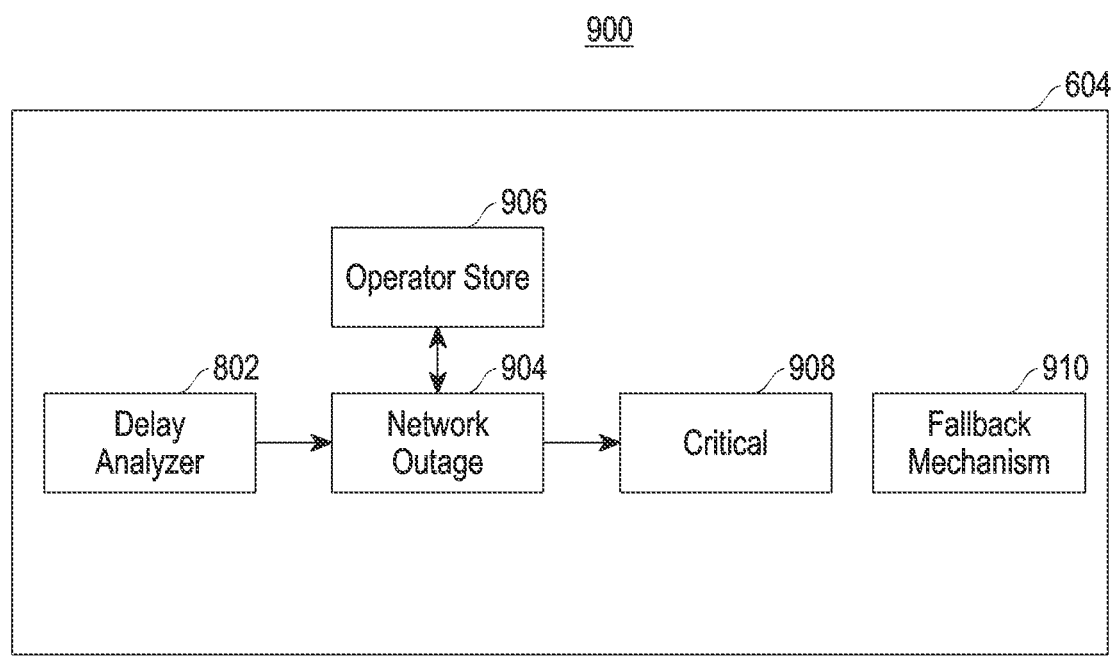
FIG. 9A illustrates a block diagram for depicting working of an ML-based communication quality analyser, according to an example embodiment of the disclosure.
Figure 9B:
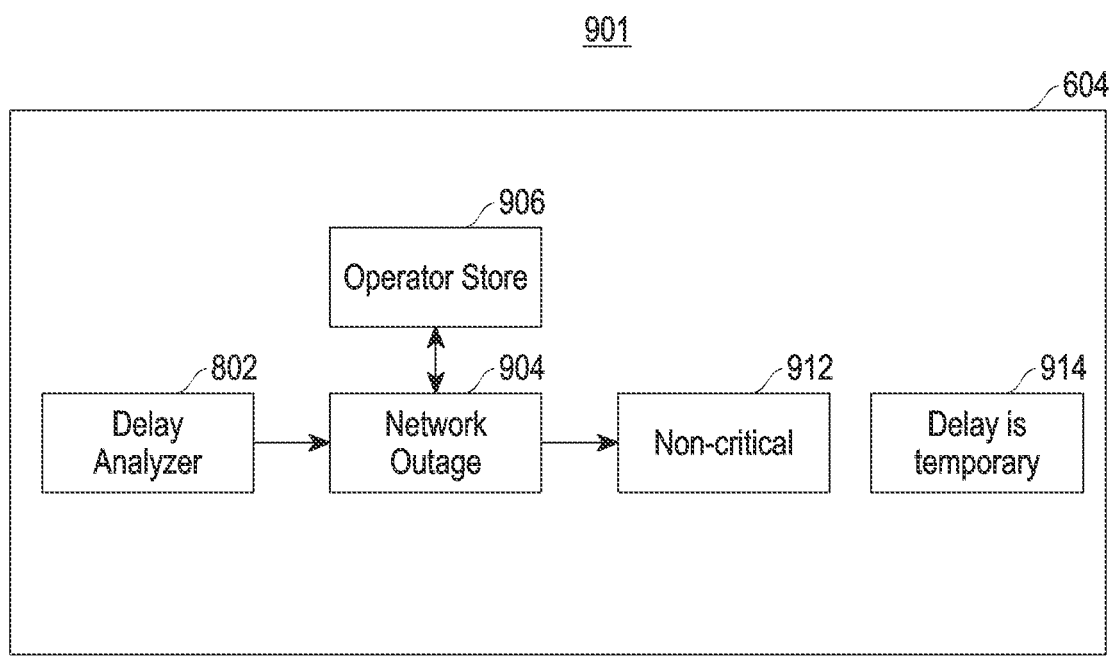
FIG. 9B illustrates a block diagram for depicting working of an ML-based communication quality analyser, according to an example embodiment of the disclosure.

FIG. 9A illustrates a block diagram 900 for depicting working of an ML-based communication quality analyser 604, according to an example embodiment of the disclosure. Further, FIG. 9B illustrates a block diagram 901 for depicting working of an ML-based communication quality analyser 604, according to an example embodiment of the disclosure. For the sake of brevity and better explanation, FIGS. 9A and 9B have been explained in conjunction with each other.

At operation 902, the delay analyzer 802 analyses the previously received sensor data and the flight path of the UAV 202. At operation 904, the category mapper 804 categorizes the delay in reception of the sensor data into the network outage based on the result of analysis and the network data received from an operator store 906. At operation 908, the classifier 806 classifies the delay in reception of the sensor data into the critical category. At operation 910, a fallback mechanism is performed to establish the communication between the ground station 204 and the UAV 202 by using the alternate communication channel upon classifying the delay in reception of the sensor data into the critical category. In an embodiment of the disclosure, the alternate communication channel corresponds to the MCPTT channel.

At operation 912, the classifier 806 classifies the delay in reception of the sensor data into the non-critical category. At operation 914, the classification of delay into the non-critical category indicates the delay is temporary and communication between the UAV 202 and the ground station 204 is predicted to be re-established via a next base station in the flight path of the UAV 202.

Figure 10:
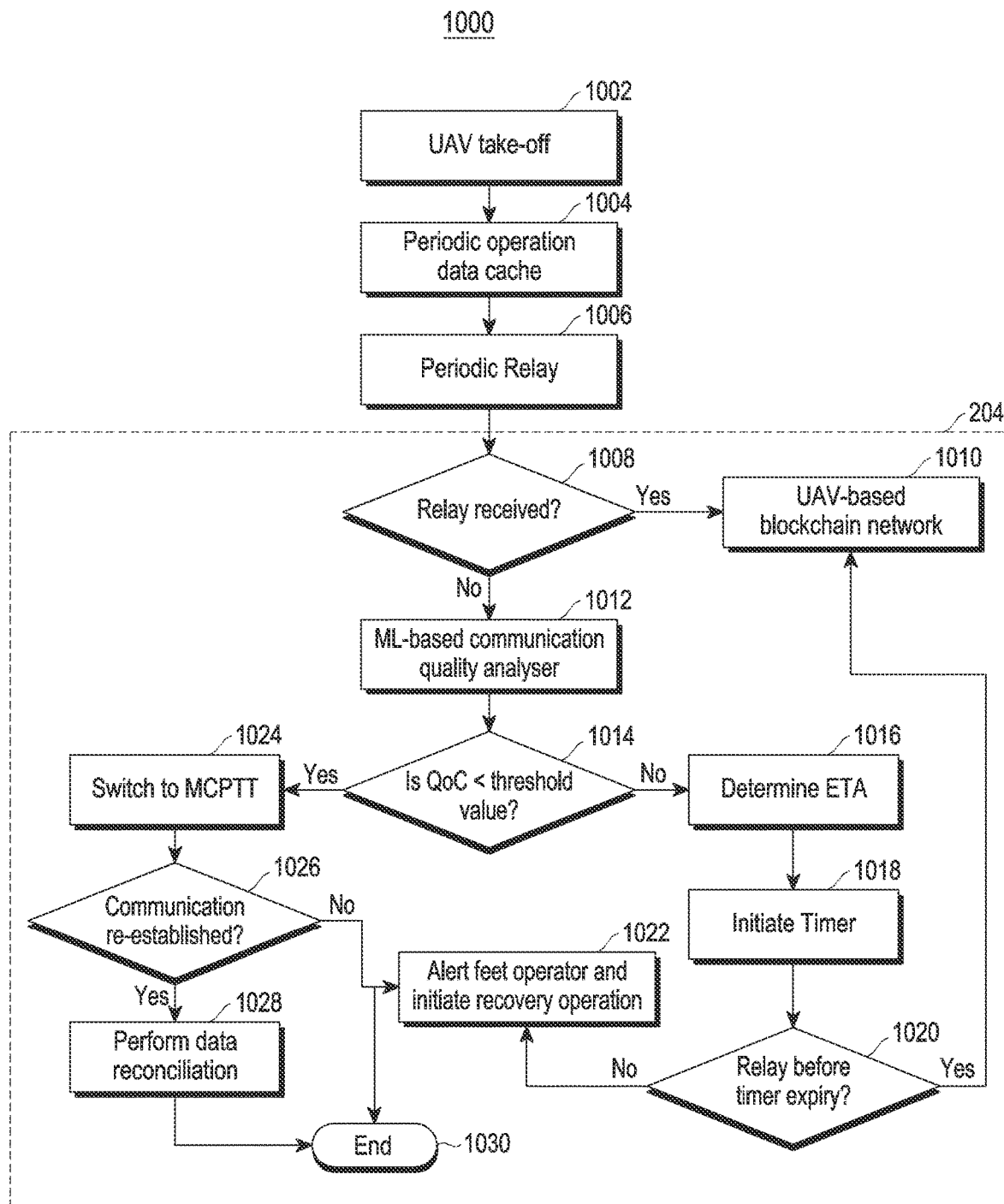
FIG. 10 illustrates a process flow diagram depicting an operation of a ground station for flight management of a fleet of UAVs, according to an example embodiment of the disclosure.

FIG. 10 illustrates a process flow diagram 1000 depicting operation of a ground station 204 for flight management of a fleet of UAVs, according to an example embodiment of the disclosure.

At operation 1002, a registered UAV 202 takes off for a mission critical fleet operation. At operation 1004, the UAV 202 performs periodic operation data cache. In an example, a sensor associated with the UAV 202 generates a value every 50 ms. The UAV 202 may transmit the generated value every 500 ms. Therefore, a set of data points may be cached locally by the UAV 202 and transmitted at one instance. At operation 1006, the UAV 202 transfers the sensor data periodically to the ground station 204. At operation 1008, the ground station 204 determines whether the sensor data associated with the UAV 202 is received from the UAV 202 within a predefined time duration from an instance of previous reception of the sensor data. At operation 1010, the UAV-based blockchain network is updated with the sensor data upon determining that the sensor data is received from the UAV 202 within the predefined time duration. When the periodic sensor data is not received from the UAV 202, the information about failure to receive the sensor data is transmitted to the ML-based communication quality analyser 604. At operation 1012, the ML-based communication quality analyser 604 generates the QoC value associated with the communication between the ground station 204 and the UAV 202 based on the previously received sensor data, the one or more delay factors determined by analysing the flight path of the UAV 202.

At operation 1014, it is determined if the generated QoC value is within a predefined QoC range by comparing the generated QoC value with the predefined QoC range. In an embodiment of the disclosure, the predefined QoC range ranges from 0 to 1. At operation 1016, ETA of the sensor data from the UAV 202 to the ground station 204 is predicted based on the generated QoC value upon determining that the QoC value is within the predefined QoC range. The ground station 204 waits for the UAV 202 to relay the sensor data to the ground station 204. At operation 1018, a timer is initiated based on the predicted ETA. At operation 1020, it is determined if the sensor data is received before the expiry of the timer. At operation 1022, the one or more alert notifications are sent to the fleet operator recommending an initiation of the recovery operation for locating the UAV 202 when the sensor data is received before the expiry of the timer.

At operation 1024, a service switcher decides to switch the UAV 202 to the MCPTT network to confirm if the UAV 202 is still available and able to re-establish the communication link to the ground station 204 upon determining that the QoC value is outside the predefined QoC range. At operation 1026, it is determined if the communication between the ground station 204 and the UAV 202 is re-established. Perform operation 1022 upon determining that the communication between the ground station 204 and the UAV 202 is not re-established by using the MCPTT network. At operation 1028, the base station performs data reconciliation and the mission continues. Before switching to the MCPTT network, the ground station 204 may not have received the sensor data from the UAV 202 for several time periods. Once the MCPTT link is established, the base station may receive missing data including the sensor data in one instance. The missing data is required to be processed/reconciled by the ground-station 204. In an example, at a particular instance of time, it may be known to the ground-station 204 which specific sensor failed. At operation 1030, the process completes. In an example embodiment of the disclosure, the QoC value is inversely proportional to ETA i.e., when the QoC value is high, the value of ETA may be less.

Figure 11:
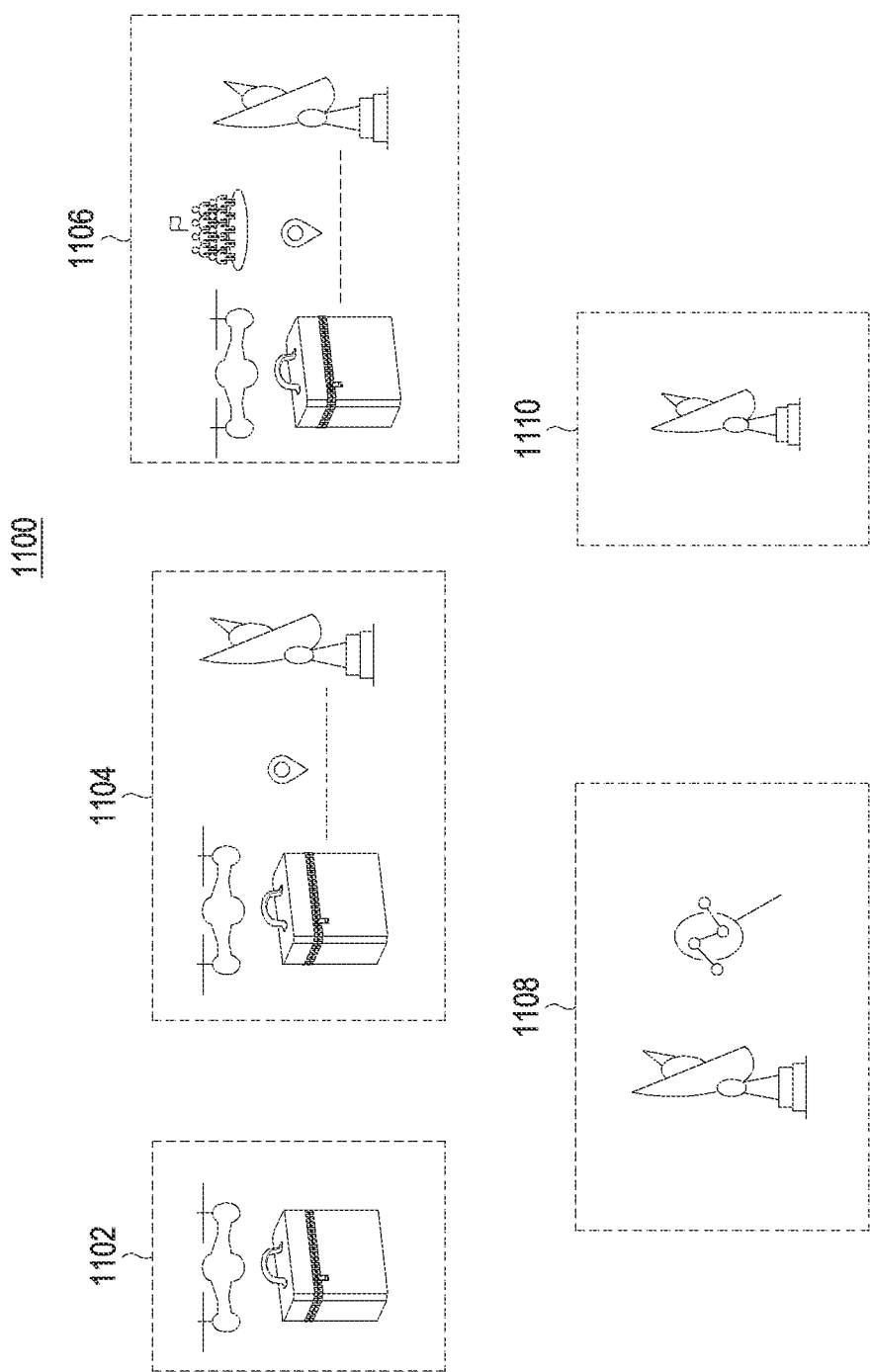
FIG. 11 illustrates a pictorial representation depicting an operation of a ground station for flight management of a fleet of UAVs, according to an example embodiment of the disclosure.

FIG. 11 illustrates a pictorial representation 1100 depicting an operation of a ground station 204 for flight management of a fleet of UAVs, according to an example embodiment of the disclosure.

At operation 1102, the UAV 202 initiates a mission critical operation to deliver an organ to a hospital for transplantation. At operation 1104, the UAV 202 transmits its location coordinates to the ground station 204 by using the cellular or mobile network. At operation 1106, the UAV 202 fails to transmit the location coordinates in a predefined interval due to network outage. At operation 1108, the ground station 204 does not receive the location coordinates in the desired interval and an alert mechanism is triggered. At operation 110, the UAV 202 performs dynamic path planning. In the dynamic path planning, the one or more delay factors are determined. The determined one or more delay factors are categorized into the critical and the non-critical category. The one or more actions are performed by the UAV 202 in a real-time to re-establish the communication between the UAV 202 and the ground station 204.

In an example embodiment of the disclosure, at operation 1108, the ground station 204 does not receive the location coordinates in the desired interval and the start analyzing the one or more delay factors to generate the QoC value. Additionally, the ground station 204 categories the one or more delay factors into the critical category and the non-critical category based on the generated QoC value. The ground station 204 also determines the ETA of the location coordinates from the UAV 202 to the ground station 204 based on the generated QoC value. At operation 1110, the UAV 202 transmits the location coordinates to the ground station 204 within the determined ETA.

Figure 12:
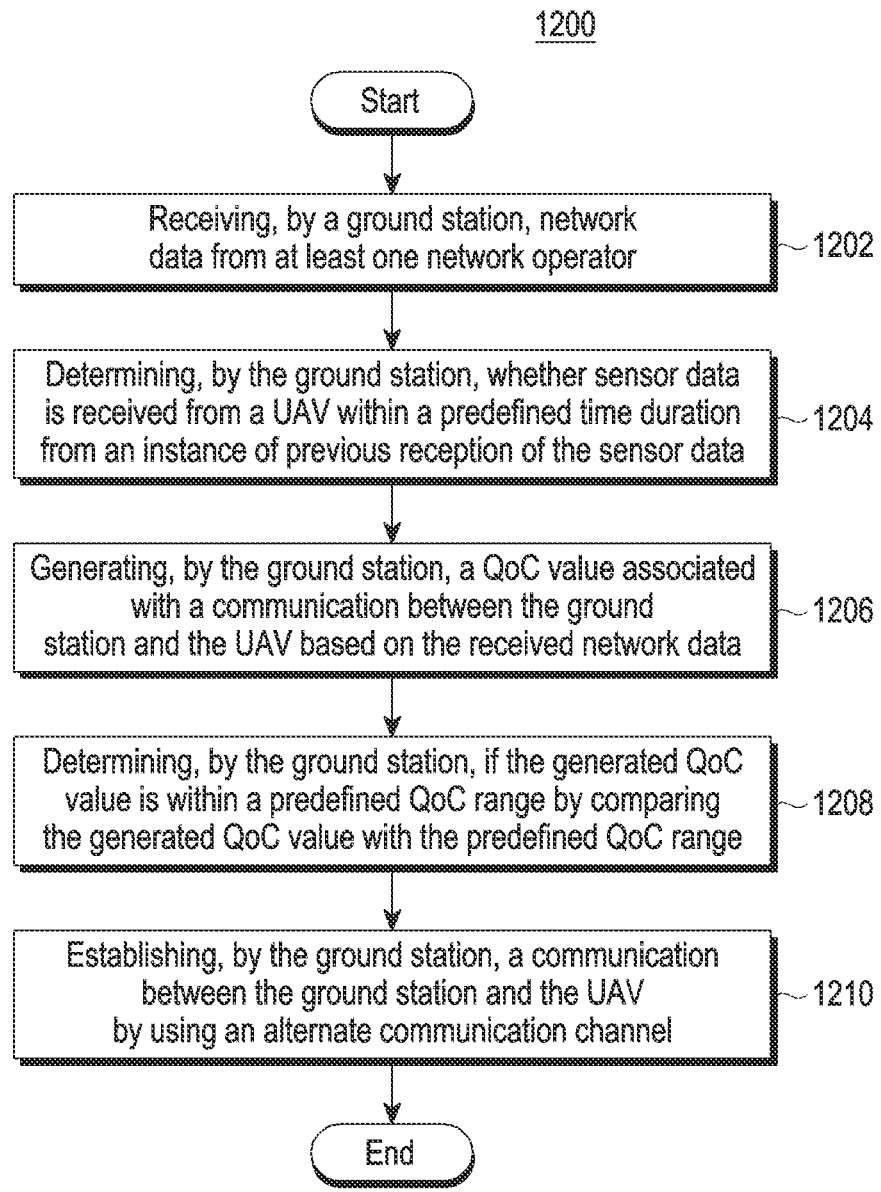
FIG. 12 illustrates a process flow depicting a method for flight management of a fleet of UAVs, according to an example embodiment of the disclosure.

FIG. 12 illustrates a process flow depicting a method 1200 for flight management of a fleet of UAVs, according to an example embodiment of the disclosure.

The method 1200 may be performed by a system implemented in a ground station 204, as shown in FIG. 2.

At operation 1202, the method 1200 includes receiving network data from one or more network operators. For example, the one or more network operators may include mobile, cellular station, and the like. In an example embodiment of the disclosure, the network data includes weather data/weather and climatic conditions, geospatial data, network congestion data, network outage data, or any combination thereof. In an example, the weather data may include climatic and weather conditions, such as rain, hailstorm, snow with ice crystals, drizzle, high wind, sleet, precipitation rate, and the like. In an example embodiment of the disclosure, the geospatial data corresponds to information associated objects, events, or phenomena having a location on the surface of the earth. For example, geospatial data may include coordinate information (e.g., latitude and longitude), identification of tall buildings in particular coordinates, and the like. In an embodiment of the disclosure, the network congestion may occur due to one or more reasons, such as crowded locations, road accidents, shopping area, political rallies, seasonal festival, and the like. In an embodiment of the disclosure, the network outage may be due to riots zone, violence zone, military zone, and the like. One or more obstacles between the aerial vehicle and the ground station 204 may be buildings, trees, human beings, animals, and the like. In an example embodiment of the disclosure, the network data is received from the one or more network operations via one or more communication techniques, such as cellular networks, mobile networks, and the like.

At operation 1204, the method 1200 includes determining whether sensor data associated with the UAV 202 is received from the UAV 202 within a predefined time duration from an instance of previous reception of the sensor data. In one embodiment of the disclosure, the sensor data is received from the one or more network operations via the one or more communication techniques. In an example embodiment of the disclosure, the sensor data includes location coordinates of the UAV 202 and a condition of one or more equipment of the UAV 202. In an example embodiment of the disclosure, the location coordinates are received via UAV's GPS location or UAV connection to cellular networks. In an example embodiment of the disclosure, a location of the UAV 202 may be determined based on the location coordinates for determining one or more factors that affect communication link in the determined location of the UE. In an example, a mass gathering of people, shopping zone, festival, and the like may have more people connected to a particular base station beyond an estimated capacity to be allowed in that location. In such cases, UAV communication link delay may occur for a limited time, until the UAV 202 crosses that particular base station. In still an example embodiment of the disclosure, the condition of the one or more equipment may include low battery, damaged sensors, failure of the one or more equipment, damage in the one or more equipment, and the like. In an example embodiment of the disclosure, the one or more equipments includes, but not limited to, one or more sensors, a battery of the UAV 202, and the like.

At operation 1206, the method 1200 includes generating the quality of communication (QoC) value associated with a communication between the ground station 204 and the UAV 202 based on the received network data upon determining that the sensor data is not received by the ground station 204 within the predefined time duration. In generating the QoC value, the method 1200 includes determining one or more delay factors responsible for an unsuccessful reception of the sensor data from the UAV 202 within the predefined time duration based on past sensor data, a flight path of the UAV 202, past network data, a received network data, or any combination thereof. In one embodiment of the disclosure, the past sensor data corresponds to the sensor data received before the predefined time duration. The one or more delay factors include weather and climatic conditions, the network congestion, the network outage, the one or more obstacles between the UAV 202 and the ground station 204, the condition of one or more equipment of the UAV 202, or any combination thereof. The method 1200 also includes generating the QoC value based the detected on one or more delay factors, the past sensor data, the past network data, a predefined weightage associated with each of the one or more delay factors, the received network data, a set of past QoC values, a set of past ETA values associated with the UAV 202, or any combination thereof. For example. The past network data may be historic weather pattern.

In an example embodiment of the disclosure, the method 1200 includes determining an estimated time of arrival (ETA) of the sensor data from the UAV 202 to the ground station 204 based on the generated QoC value upon determining that the QoC value is within the predefined QoC range.

At operation 1208, the method 1200 includes determining if the generated QoC value is within a predefined QoC range by comparing the generated QoC value with the predefined QoC range. In an example embodiment if the disclosure, the predefined QoC range is from 0 to 1.

At operation 1210, the method 1200 includes establishing a communication between the ground station 204 and the UAV 202 by using an alternate communication channel upon determining that the QoC value is outside the predefined QoC range. In one embodiment of the disclosure, the alternate communication channel corresponds to a mission critical push-to-talk (MCPTT) channel. In an embodiment of the disclosure, the MCPTT refers to a push-to-talk product functionality that meets the requirements for public safety mission-critical voice communication. The MCPTT channel includes high availability, reliability, low-latency, support for group calls and 1:1 calls, talker identification, device-to-device direct communications, emergency calling, clear audio quality, and the like.

The method 1200 may include generating one or more alert notifications recommending initiation of recovery operation for locating the UAV 202 when the sensor data is not received from the UAV 202 within the determined ETA or the communication is not established between the ground station 204 and the UAV 202 by using the alternate communication channel. In an example embodiment of the disclosure, the one or more alert notifications are received by fleet operators to initiate the recovery operation for locating the UAV 202.

The method 1200 may include generating a discrete QoC value associated with each of the one or more delay factors based on the flight path of the UAV 202, the received network data, the set of past QoC values captured during fleet operations, the set of past ETA values associated with the UAV 202, or any combination thereof. In an example embodiment of the disclosure, the ground station 204 automatically decides and suppress the non-critical events based on the generated discrete QoC value associated with each of the one or more delay factors. The details on generating the discrete QoC value have been elaborated in previous paragraphs of the description with reference to FIG. 6.

The method 1200 may include identifying a delay category associated with each of the one or more delay factors by analysing the generated discrete QoC value and the predefined QoC range. In an example embodiment of the disclosure, the delay category is a critical category or a non-critical category. In an embodiment of the disclosure, in the non-critical category, the generated discrete QoC value is within the predefined QoC range i.e., 0 to 1. Further, in the critical category, the generated discrete QoC value is nearly 0. For example, the one or more delay factors associated with the non-critical category include network congestion in particular location coordinates for few seconds, communication delay due to weather, and the like. The one or more delay factors associated with the critical category includes accident, failure of sensors, failure of a battery, network outage due to riots, and the like. Furthermore, the method 1200 includes determining the ETA of the sensor data from the UAV 202 based on the generated discrete QoC value when the identified delay category is the non-critical category. The method 1200 includes establishing a communication between the ground station 204 and the UAV 202 by using the alternate communication channel when the identified delay category is the critical category. The ground station 204 also determines the ETA in relaying the sensor data to the ground station 204 based on the generated discrete QoC value. The details on identification of the delay category associated with each of the one or more delay factors have been elaborated in previous in subsequent paragraphs of the description with reference to FIG. 5.

The method 1200 may include identifying the one or more delay factors responsible for an unsuccessful reception of the sensor data from the UAV 202 based on the generated discrete QoC value, the location coordinates of the UAV 202, and the predefined QoC range. In an example embodiment of the disclosure, the one or more delay factors are responsible for degrading the QoC resulting in delay in communication from UAV 202 and throughout the course of travel of the UAV 202. In an example embodiment, the method 1200 includes categorizing a delay in reception of the sensor data from the UAV 202 to the ground station 204 into the critical category or the non-critical category based on the generated discrete QoC value, the predefined QoC range, the identified one or more delay factors, or any combination thereof. In an example embodiment of the disclosure, the discrete QoC value of the critical category and the non-critical category may range between 0 and 1. When the discrete QoC value is within the predefined QoC range, alerts are not generated for the recovery operation.

Further, when the discrete QoC value is nearly 0, the ground station 204 switches to MCPTT to re-establish the communication link with the UAV 202 on failing to establish the communication between UAV 202 and ground station 204. In an example embodiment of the disclosure, alert systems associated with the ground station 204 sends notification to feet operator and initiates recovery operation to prevent further disasters.

In an example embodiment, the method 1200 includes categorizing a delay in reception of the sensor data from the UAV 202 to the ground station 204 into the critical category or the non-critical category based on the generated QoC value and the predefined QoC range. In an example embodiment of the disclosure, the non-critical category indicates the delay in reception of the sensor data from the UAV 202 is temporary and communication between the UAV 202 and the ground station 204 is predicted to be re-established via a base station in the flight path of the UAV 202.

The sensor data, the flight path of the UAV 202, and the network data are stored in a UAV-based blockchain network for performing analytics and providing a dashboard view to fleet operators. In still an example embodiment of the disclosure, storage of the sensor data, the flight path and the network data in the UAV-based blockchain network may be used to address issues associated with the condition of the one or more equipment, communication lag and a violation of path of the UAV 202.

Figure 13:
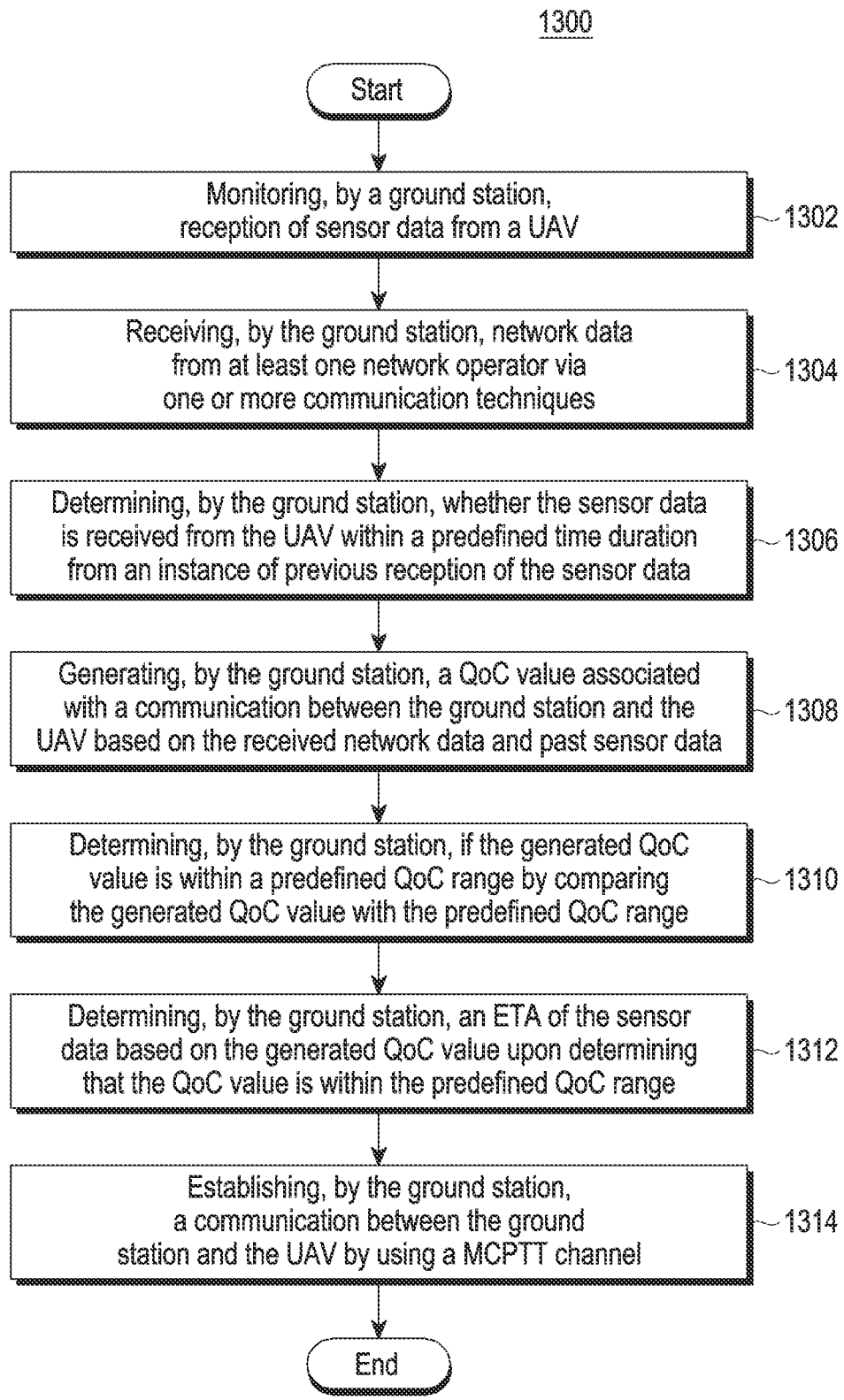
FIG. 13 illustrates n process flow depicting a method for flight management of a fleet of UAVs, according to an example embodiment of the disclosure.

FIG. 13 illustrates a process flow depicting a method 1300 for flight management of a fleet of UAVs, according to an example embodiment of the disclosure. The method 1300 may be performed by a system implemented in the ground station 204, as shown in FIG. 2.

At operation 1302, the method 1300 includes monitoring a reception of the sensor data from the UAV 202.

At operation 1304, the method 1300 includes receiving the network data from the one or more network operators via the one or more communication techniques.

At operation 1306, the method 1300 includes determining whether the sensor data associated with the UAV 202 is received from the UAV 202 within the predefined time duration from an instance of previous reception of the sensor data.

At operation 1308, the method 1300 includes generating the QoC value associated with a communication between the ground station 204 and the UAV 202 based on the received network data and the past sensor data upon determining that the sensor data is not received by the ground station 204 within the predefined time duration. In one embodiment of the disclosure, the QoC value is generated by using a machine learning (ML)-based communication quality analyser.

At operation 1310, the method 1300 includes determining if the generated QoC value is within a predefined QoC range by comparing the generated QoC value with the predefined QoC range.

At operation 1312, the method 1300 includes determining the ETA of the sensor data from the aerial vehicle to the ground station 204 based on the generated QoC value upon determining that the QoC value is within the predefined QoC range. In an example embodiment of the disclosure, the ETA is determined by using the ML-based communication quality analyser 604. The details on the ML-based communication quality analyser 604 have been elaborated in previous paragraphs of the description with reference to FIGS. 7, 8, 9A, and 9B.

At operation 1314, the method 1300 includes establishing a communication between the ground station 204 and the UAV 202 by using the MCPTT channel upon determining that the QoC value is outside the predefined QoC range. The details on establishing the communication between the ground station 204 and the UAV 202 by using the MCPTT channel have been elaborated in previous paragraphs of the description with reference to FIG. 4.

In an example embodiment of the disclosure, the ground station 204 learns from past fleet of operations, the past network data, or a combination thereof from operators and analyzes the QoC to determine one or more actions to be taken by the ground station 204 for improving the QoC, such as determining the ETA, switching to the MCPTT channel, and the like.

The disclosure provides for various technical advancements based on the key features discussed above. The disclosure automatically eliminates temporary delay due to the one or more delay factors. The disclosure provides a mechanism to analyze and enhance the QoC from the UAV 202 to ground station 204 by automatically suppressing non-critical events, false alarms and preventive measures for critical events during the dynamic path planning without manual intervention when the QoC value is beyond the predefined QoC range. Detectability of the disclosure in the market is very high and any infringement by third party vendors may be easily detected. In selective suppressing of the non-critical events in the flight path of the UAV 202, periodic communication link delays are suppressed and communication quality is enhanced in case of critical events during the fleet operation. In an example, systems in the ground station 204 are not required to be notified if communication link failure is temporary and are required to act on critical events. The disclosure learns from past fleet of operations and the network data from operators and analyzes the QoC to determine one or more actions to be taken by the ground station 204 to improve the QOC, such as determining the ETA, switching to the MCPTT channel, and the like. The disclosure provides information to a drone fleet management station about a network lag in the flight path of the UAV 202 and an associated recoverable time to re-establish communication back to the ground station 204. The disclosure facilitates monetization of the network data which may be helpful for drone service providers in fleet operation and is a critical factor in drone delivery. The disclosure also provides a fall-back mechanism to switch to the MCPTT, when the network is critically low due to curfew/riots resulting in a weak communication channel between the UAV 202 and the ground station 204. Furthermore, an ML-based model is used to generate discrete QoC values for the one or more delay factors and categories the one or more delay factors in the critical and non-critical category based on fleet operation and call quality including historic weather pattern. The discrete QoC value is generated based on geospatial, weather, network outage, network congestion, health data, and the like for enhanced accuracy.

The modules 214 may be implemented by any suitable hardware and/or set of instructions. The sequential flow illustrated in FIG. 3 is in nature and the embodiments may include addition/omission of steps as per the requirement. In some embodiments, the one or more operations performed by the modules 214 may be performed by the processor/controller based on the requirement.

According to the disclosure, a method for flight management of the fleet of the UAVs may use an ML model to generate the QoC value and determine the ETA. The one or more processors/controllers 210 may perform a pre-processing operation on the data to convert into a form appropriate for use as an input for the ML model. The ML model may be obtained by training. In an embodiment, "obtained by training" means that a predefined operation rule or the ML model configured to perform a desired feature (or purpose) is obtained by training a basic ML model with multiple pieces of training data by a training technique. The ML model may include a plurality of neural network layers. Each of the plurality of neural network layers includes a plurality of weight values and performs neural network computation by computation between a result of computation between a result of computation by a previous layer and the plurality of weight values between a result of computation by a previous layer and the plurality of weight values.

In an example embodiment of the disclosure, reasoning prediction is a technique of logically reasoning and predicting by determining information and includes, e.g., knowledge-based reasoning, optimization prediction, preference-based planning, or recommendation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for flight management of a fleet of unmanned aerial vehicles (UAVs), the method comprising:
   receiving, by a ground station, network data from at least one network operator;
   determining, by the ground station, whether sensor data associated with a UAV is received from the UAV within a predefined time duration from an instance of previous reception of the sensor data;
   generating, by the ground station, a quality of communication (QoC) value associated with a communication between the ground station and the UAV based on the received network data upon determining that the sensor data is not received by the ground station within the predefined time duration;
   determining, by the ground station, whether the generated QoC value is within a predefined QoC range; and
   establishing, by the ground station, the communication between the ground station and the UAV by using an alternate communication channel upon determining that the generated QoC value is outside the predefined QoC range.

2. The method of claim 1, further comprising:
   determining, by the ground station, an estimated time of arrival (ETA) of the sensor data from the UAV to the ground station based on the generated QoC value upon determining that the QoC value is within the predefined QoC range.

3. The method of claim 2, further comprising:
   generating, by the ground station, one or more alert notifications recommending initiation of recovery operation for locating the UAV when one of: the sensor data is not received from the UAV within the determined ETA, and the communication is not established between the ground station and the UAV by using the alternate communication channel.

4. The method of claim 1, wherein the alternate communication channel corresponds to a mission critical push-to-talk (MCPTT) channel.

5. The method of claim 1,
   wherein the sensor data comprises location coordinates of the UAV and a condition of one or more equipment of the UAV, and
   wherein the one or more equipment of the UAV comprise one or more sensors and a battery of the UAV.

6. The method of claim 1, wherein the network data comprises at least one of weather data, geospatial data, network congestion data, and network outage data.

7. The method of claim 1, wherein the generating of the QoC value comprises:
   determining, by the ground station, one or more delay factors responsible for unsuccessful reception of the sensor data from the UAV within the predefined time duration based on at least one of: past sensor data, a flight path of the UAV, past network data, and the received network data, wherein the past sensor data corresponds to the sensor data received before the predefined time duration; and
   generating, by the ground station, the QoC value based on at least one of: the detected one or more delay factors, the past sensor data, the past network data, a predefined weightage associated with each of the one or more delay factors, the received network data, a set of past QoC values and a set of past estimated time of arrival (ETA) values associated with the UAV.

8. The method of claim 7, wherein the one or more delay factors comprise at least one of weather and climatic conditions, network congestion, network outage, one or more obstacles between the UAV and the ground station, and a condition of one or more equipment of the UAV.

9. The method of claim 7, further comprising:
   generating, by the ground station, a discrete QoC value associated with each of the one or more delay factors based on at least one of: the flight path of the UAV, the received network data, the set of past QoC values and the set of past ETA values associated with the UAV;
   identifying, by the ground station, a delay category associated with each of the one or more delay factors based on the generated discrete QoC value and the predefined QoC range, wherein the delay category is one of a critical category and a non-critical category;
   determining, by the ground station, the ETA of the sensor data from the UAV based on the generated discrete QoC value when the identified delay category is the non-critical category; and
   establishing, by the ground station, the communication between the ground station and the UAV by using the alternate communication channel when the identified delay category is the critical category.

10. The method of claim 9, further comprising:
    identifying, by the ground station, the one or more delay factors responsible for unsuccessful reception of the sensor data from the UAV based on the generated discrete QoC value and the predefined QoC range; and
    categorizing, by the ground station, a delay in reception of the sensor data from the UAV to the ground station into one of the critical category and the non-critical category based on at least one of: the generated discrete QoC value, the predefined QoC range, and the identified one or more delay factors.

11. The method of claim 7, wherein the sensor data, the flight path of the UAV, and the network data are stored in a UAV-based blockchain network.

12. The method of claim 1, further comprising:
    categorizing, by the ground station, a delay in reception of the sensor data from the UAV to the ground station into one of a critical category and a non-critical category based on the generated QoC value and the predefined QoC range, wherein the non-critical category indicates the delay in reception of the sensor data from the UAV is temporary, and wherein the communication between the UAV and the ground station is predicted to be re-established via a base station in a flight path of the UAV.

13. A method for flight management of a fleet of unmanned aerial vehicles (UAVs), the method comprising:

monitoring, by a ground station, reception of sensor data from a UAV;

receiving, by the ground station, network data from at least one network operator via one or more communication techniques;

determining, by the ground station, whether the sensor data associated with the UAV is received from the UAV within a predefined time duration from an instance of previous reception of the sensor data;

generating, by the ground station, a quality of communication (QoC) value associated with a communication between the ground station and the UAV based on the received network data and past sensor data upon determining that the sensor data is not received by the ground station within the predefined time duration;

determining, by the ground station, whether the generated QoC value is within a predefined QoC range;

determining, by the ground station, an estimated time of arrival (ETA) of the sensor data from the UAV to the ground station based on the generated QoC value upon determining that the generated QoC value is within the predefined QoC range; and establishing, by the ground station, the communication between the ground station and the UAV by using a mission critical push-to-talk (MCPTT) channel upon determining that the QoC value is outside the predefined QoC range.

14. The method of claim 13, wherein the sensor data comprises location coordinates of the UAV and a condition of one or more equipment of the UAV, and wherein the one or more equipment of the UAV comprise one or more sensors and a battery of the UAV.

15. The method of claim 13, wherein the network data comprises at least one of weather data, geospatial data, network congestion data, and network outage data.

16. The method of claim 13, further comprising:

generating, by the ground station, one or more alert notifications recommending initiation of recovery operation for locating the UAV when one of: the sensor data is not received from the UAV within the determined ETA, and the communication is not established between the ground station and the UAV by using an alternate communication channel.

17. The method of claim 13, wherein the QoC value is generated by using a machine learning (ML)-based communication quality analyser.

18. The method of claim 13, wherein the ETA is determined by using an ML-based communication quality analyser.

19. A system at a ground station for flight management of a fleet of unmanned aerial vehicles (UAVs), the system comprising:

a memory; and one or more processors communicatively coupled to the memory, the one or more processors are configured to:

receive network data from at least one network operator, determine whether sensor data associated with the UAV is received from a UAV within a predefined time duration from an instance of previous reception of the sensor data, generate a quality of communication (QoC) value associated with a communication between the ground station and the UAV based on the received network data upon determining that the sensor data is not received by the ground station within the predefined time duration, determine whether the generated QoC value is within a predefined QoC range, and establish the communication between the ground station and the UAV by using an alternate communication channel upon determining that the generated QoC value is outside the predefined QoC range.

20. The system of claim 19, wherein the one or more processors are further configured to:

determine an estimated time of arrival (ETA) of the sensor data from the UAV to the ground station based on the generated QoC value upon determining that the QoC value is within the predefined QoC range; and generate one or more alert notifications recommending initiation of recovery operation for locating the UAV when one of: the sensor data is not received from the UAV within the determined ETA, and the communication is not established between the ground station and the UAV by using the alternate communication channel.

* * * * *